(12) United States Patent
Winzer

(10) Patent No.: US 11,070,897 B1
(45) Date of Patent: Jul. 20, 2021

(54) COMMUNICATION SYSTEM EMPLOYING OPTICAL FRAME TEMPLATES

(71) Applicant: Nubis Communications, Inc., Aberdeen, NJ (US)

(72) Inventor: Peter Johannes Winzer, Aberdeen, NJ (US)

(73) Assignee: Nubis Communications, Inc., Aberdeen, NJ (US)

( * ) Notice: Subject to any disclaimer, the term of this patent is extended or adjusted under 35 U.S.C. 154(b) by 0 days.

(21) Appl. No.: 16/847,705

(22) Filed: Apr. 14, 2020

(51) Int. Cl.
*H04B 10/00* (2013.01)
*H04Q 11/00* (2006.01)
*H04J 14/00* (2006.01)

(52) U.S. Cl.
CPC ..... *H04Q 11/0067* (2013.01); *H04Q 11/0005* (2013.01); *H04Q 2011/0041* (2013.01); *H04Q 2213/13038* (2013.01); *H04Q 2213/214* (2013.01)

(58) Field of Classification Search
CPC .. H04B 10/2587; H04B 10/80; H04B 10/801; G02B 6/42; G02F 1/105
See application file for complete search history.

(56) References Cited

U.S. PATENT DOCUMENTS

| | | | |
|---|---|---|---|
| 5,416,861 A | 5/1995 | Koh | |
| 5,442,475 A | 8/1995 | Bausman | |
| 5,790,293 A * | 8/1998 | Frigo | H04B 10/035 398/201 |
| 6,895,189 B1 | 5/2005 | Bedrosian | |
| 6,959,152 B2 | 10/2005 | Fujiwara | |
| 7,106,970 B2 | 9/2006 | Fujiwara | |
| 2008/0107419 A1 * | 5/2008 | Won | H04B 10/2587 398/130 |
| 2020/0382214 A1 * | 12/2020 | Oh | H01S 5/022 |

OTHER PUBLICATIONS

Bhatnagar et al., "Optical Interconnection and Clocking for Electronic Chips," Proceedings of the 8th World Multiconference on Systemics, Cybernetics and Informatics (SCI 2004), pp. 1-5, Orlando, USA, Jul. 18-21, 2004.
Mule et al., "Electrical and Optical Clock Distribution Networks for Gigascale Microprocessors," IEEE Transactions on Very Large Scale Integration (VLSI) Systems, vol. 10, No. 5, pp. 582-594, Oct. 2002.
Sohanpal et al., "Clock and Data Recovery-Free Data Communications Enabled by Multi-Core Fiber With Low Thermal Sensitivity of Skew," IEEE/OSA J. Lightwave Technol., vol. 38, No. 7, pp. 1636-1643, Apr. 1, 2020.
Goodman et al., "Optical Interconnections for VLSI Systems," Proc. IEEE, vol. 72, No. 7, pp. 850-866, July 1984.

(Continued)

*Primary Examiner* — Daniel G Dobson
(74) *Attorney, Agent, or Firm* — Fish & Richardson P.C.

(57) ABSTRACT

An optical communication system comprises an optical communication device and an optical power supply configured to generate a sequence of optical frame templates directed to the optical communication device. The optical communication device may use the received optical frame templates as a light source for generating data-loaded optical frames and/or may extract from the optical frame templates control information encoded therein using one or more headers thereof.

39 Claims, 9 Drawing Sheets

(56) References Cited

OTHER PUBLICATIONS

Liboiron-Ladouceur et al., "Bit-Parallel Message Exchange and Data Recovery in Optical Packet Switched Interconnection Networks," IEEE Photonics Technology Letters, vol. 18, No. 6, pp. 779-781, Mar. 15, 2006.
Delfyett et al., "Optical Clock Distribution Using a Mode-Locked Semiconductor Laser Diode System," IEEE/OSA J. Lightwave Technology, vol. 9, No. 12, pp. 1646-1649, Dec. 1991.
Winzer et al., "107-Gb/s Optical Signal Generation Using Electronic Time-Division Multiplexing," IEEE/OSA J. Lightwave Technology, vol. 24, No. 8, pp. 3107-3113, Aug. 2006.
Agrawal et al., "A 8x5 Gb/s Source-Synchronous Receiver with Clock Generator Phase Error Correction," Proc. IEEE 2008 Custom Intergrated Circuits Conference (CICC), pp. 459-462.

* cited by examiner

103

103

103

610

610

880

880

880

880

1001

1000

COMMUNICATION SYSTEM EMPLOYING OPTICAL FRAME TEMPLATES

BACKGROUND

Field

Various example embodiments relate to optical communication equipment and, more specifically but not exclusively, to optical power supplies.

Description of the Related Art

This section introduces aspects that may help facilitate a better understanding of the disclosure. Accordingly, the statements of this section are to be read in this light and are not to be understood as admissions about what is in the prior art or what is not in the prior art.

As the input/output (I/O) capacities of electronic processing chips increase, electrical signals may not provide sufficient I/O capacity across the limited size of a practically viable electronic chip package. A feasible alternative may be to interconnect electronic chip packages using optical signals, which can typically be delivered with a much higher I/O capacity per unit area compared to electrical I/Os.

SUMMARY OF THE INVENTION

Disclosed herein are various embodiments of an optical communication system comprising an optical communication device and an optical power supply configured to generate a sequence of optical frame templates directed to the optical communication device. The optical communication device may use the received optical frame templates as a light source for generating data-loaded optical frames and/or may extract from the optical frame templates control information encoded therein using one or more headers thereof.

According to an example embodiment disclosed above, provided is an apparatus comprising: a light source; and an electronic controller connected to cause the light source to produce a sequence of optical frame templates, each of the optical frame templates comprising a respective frame header, and a respective frame body; wherein each frame body comprises a respective optical pulse train; and wherein the light source and the electronic controller are configured to imprint control information onto light of at least some of the optical frame templates using time intervals corresponding to the respective frame headers of the sequence.

In some embodiments of the above apparatus, said at least some of the optical frame templates include are at least three optical frame templates.

In some embodiments of any of the above apparatus, said at least some of the optical frame templates are copies of one another.

In some embodiments of any of the above apparatus, none of the respective frame bodies of the sequence of optical frame templates carry payload data.

In some embodiments of any of the above apparatus, the sequence of optical frame templates has a first time duration; each of the respective frame headers has a second time duration; each of the respective frame bodies has a third time duration, a sum of the second and third time durations being smaller than the first time duration; and each of the respective optical pulse trains has a period of a fourth time duration that is smaller than a smaller one of the second and third time durations.

In some embodiments of any of the above apparatus, the fourth time duration is at most 100 ps.

In some embodiments of any of the above apparatus, the third time duration is at least 10 longer than the fourth time duration.

In some embodiments of any of the above apparatus, the third time duration is at least 100 longer than the fourth time duration.

In some embodiments of any of the above apparatus, the third time duration is at least 1000 longer than the fourth time duration.

In some embodiments of any of the above apparatus, the second time duration is at most 10% of the third time duration.

In some embodiments of any of the above apparatus, the second time duration is at most 1% of the third time duration.

In some embodiments of any of the above apparatus, the first time duration is at least 10 times longer than the third time duration.

In some embodiments of any of the above apparatus, the first time duration is an integer multiple of the sum of the second and third time durations.

In some embodiments of any of the above apparatus, the sum of the second and third time durations is an integer multiple of the fourth time duration.

In some embodiments of any of the above apparatus, the sequence of optical frame templates is periodic with a period equal to the sum of the second and third time durations.

In some embodiments of any of the above apparatus, the apparatus further comprises a reference clock, the reference clock comprising at least one of: a high-precision clock, a receiver capable of obtaining a reference clock from a Global Positioning System, and a device connectable to a stratum clock of a synchronous optical network.

In some embodiments of any of the above apparatus, the second and third time durations are derived from the reference clock.

In some embodiments of any of the above apparatus, the fourth time duration is derived from the reference clock.

In some embodiments of any of the above apparatus, the respective optical pulse trains of at least two optical frame templates of the sequence are frame-synchronized.

In some embodiments of any of the above apparatus, the respective optical pulse trains of at least two optical frame templates are synchronized with one another.

In some embodiments of any of the above apparatus, the respective optical pulse train of at least one optical frame template extends into the respective frame header thereof.

In some embodiments of any of the above apparatus, the light source and the electronic controller are configured to imprint the control information using digital changes of an optical-field parameter; and the optical-field parameter is selected from a parameter set consisting of: an intensity of light, a phase of light, a carrier frequency of light, and a polarization of light.

In some embodiments of any of the above apparatus, the control information comprises at least one of: a clock frequency, a clock phase, a synchronization time stamp, a frame delimiter, a frame counter, status information, a heartbeat signal, and a control command for a network element.

In some embodiments of any of the above apparatus, the light source comprises one or more of: a continuous-wave laser, an optical modulator, a directly modulated laser, an actively mode-locked laser, a passively mode-locked laser, and an optical switch.

In some embodiments of any of the above apparatus, the optical modulator comprises one or more of: an intensity modulator, a phase modulator, a polarization modulator, and a frequency shifter.

In some embodiments of any of the above apparatus, the apparatus further comprises an optical splitter configured to split the sequence of optical frame templates into two or more portions.

In some embodiments of any of the above apparatus, the light source comprises: a first optical pulse source configured to emit light at a first carrier frequency; a second optical pulse source configured to emit light at a second carrier frequency different from the first carrier frequency; and an optical switch configured to select either the light emitted by the first optical pulse source or the light emitted by the second optical pulse source.

In some embodiments of any of the above apparatus, a difference between the first carrier frequency and the second carrier frequency is greater than a pulse-repetition rate of the respective optical pulse train.

In some embodiments of any of the above apparatus, the apparatus further comprises an optical modulator configured to load different respective payload-data sequences into the respective frame bodies of different ones of the optical frame templates.

In some embodiments of any of the above apparatus, the optical modulator and the light source are optically connected by way of at least one optical fiber.

In some embodiments of any of the above apparatus, the at least one optical fiber has a length of at least one meter.

According to another example embodiment disclosed above, provided is an apparatus comprising: a first optical interface connectable to receive a sequence of optical frame templates, each of the optical frame templates comprising a respective frame header and a respective frame body, the frame body comprising a respective optical pulse train; an optical splitter connected to the first optical interface; an optical modulator connected to a first output of the optical splitter and configured to load data into the respective frame bodies to convert the sequence of optical frame templates into a corresponding sequence of loaded optical frames; and an optical receiver connected to a second output of the optical splitter and configured to extract control information from the respective frame headers.

In some embodiments of the above apparatus, the extracted information comprises at least one of: a clock frequency, a clock phase, a synchronization time stamp, a frame delimiter, a frame counter, status information, a heartbeat signal, and a control command for a network element.

In some embodiments of any of the above apparatus, the optical modulator is configured to modulate one or more of: an intensity of light, a phase of light, a carrier frequency of light, and a polarization of light.

In some embodiments of any of the above apparatus, the optical modulator is configured to modulate at a symbol rate equal to a pulse-repetition rate of the respective optical pulse train.

In some embodiments of any of the above apparatus, the optical modulator is configured to modulate individual pulses of the respective optical pulse train.

In some embodiments of any of the above apparatus, the optical receiver comprises one or more of: a p-i-n photodetector, an avalanche photodetector, a coherent receiver, electronic processing circuitry, and one or more optical elements configured to convert encoded optical signals into optical signals detectable using intensity detection.

In some embodiments of any of the above apparatus, the one or more optical elements comprise one or more of: a polarization filter, a polarization splitter, a delay interferometer, a wavelength filter, a wavelength demultiplexer, and a spatial-mode demultiplexer.

In some embodiments of any of the above apparatus, the apparatus further comprises a second optical interface connectable to receive another sequence of loaded optical frames; and a second optical receiver connected to the second optical interface and configured to extract information from said another sequence.

In some embodiments of any of the above apparatus, the extracted information comprises at least one of: a clock frequency, a clock phase, a synchronization time stamp, a frame delimiter, a frame counter, status information, a heartbeat signal, and a control command for a network element.

According to yet another example embodiment, provided is an apparatus comprising a control system configured to synchronize two or more network elements, the control system comprising: a first port configured to receive a first local time information from a first network element; a second port configured to receive a second local time information from a second network element; a processor configured to compute, from the first and second local time informations, one or more global time values; and a third port configured to transmit the one or more global time values to the first network element or to a third network element different from the first and second network elements.

In some embodiments of the above apparatus, the first local time information and the second local time information each comprise two respective local time values, said local time values being associated with a same time stamp extracted by each of the first and second network elements from respective sequences of optical frame templates and loaded optical frames received thereat.

In some embodiments of any of the above apparatus, the first local time information and the second local time information each represent a function of two local time values, said local time values being associated with a same time stamp extracted by each of the first and second network elements from respective sequences of optical frame templates and loaded optical frames received thereat.

In some embodiments of any of the above apparatus, the control system is configured to compute a sum of the received first local time information and the received second local time information.

In some embodiments of any of the above apparatus, the control system is configured to compute a difference of the received first local time information and the received second local time information.

In some embodiments of any of the above apparatus, the processor is a distributed processor having parts thereof located at different computers.

In some embodiments of any of the above apparatus, the processor is physically integrated into one or more network elements.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION OF SOME EMBODIMENTS

Emerging optical interconnects aim to co-package and even co-integrate optical transponders with electronic processing chips, which necessitates transponder solutions that consume relatively low power and that are sufficiently robust against significant temperature variations as may be found within an electronic processing chip package. Of significant interest are massively spatially parallel optical interconnect solutions that multiplex information onto relatively few wavelengths and use a relatively large number of parallel spatial paths for chip-to-chip interconnection. In such systems, it may be beneficial to place the light source outside the package housing the corresponding photonic and electronic processing chips. It may further be beneficial to distribute pulsed optical signals both as an optical power supply to provide light for local modulation and as a clock reference within a corresponding island of synchronicity.

Furthermore, efficient distributed computing may benefit from accurate synchronization of network and compute elements and time stamping therein. In one example, accurate synchronization of network elements allows for circuit switching or synchronous cell switching in addition to or instead of asynchronous packet switching, which may help to reduce or avoid packet buffering, packet loss, and/or random packet delays at network elements. In another example, accurate time stamping of data in a distributed database system may facilitate efficient database processing.

Figure 1:
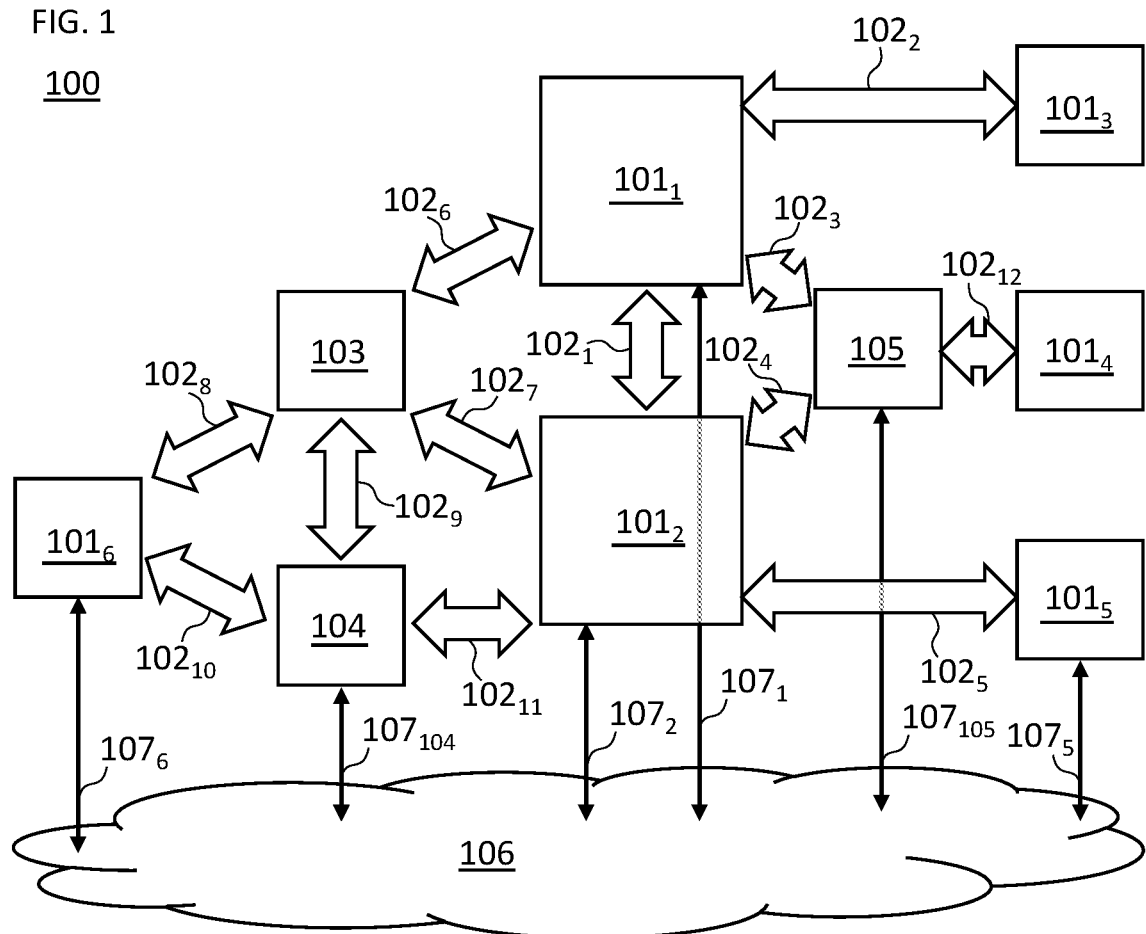
FIG. 1 shows a block diagram of a communication system in which at least some embodiments may be practiced.

FIG. 1 shows a block diagram of a communication system 100 in which at least some embodiments may be practiced. As shown, system 100 comprises nodes $101_1$-$101_6$, which in some embodiments may each comprise one or more of: optical communication devices, electronic and/or optical switching devices, electronic and/or optical routing devices, network control devices, traffic control devices, synchronization devices, computing devices, and data storage devices. Nodes $101_1$-$101_6$ may be suitably interconnected by optical fiber links $102_1$-$102_{12}$ establishing communication paths between the communication devices within the nodes. System 100 may also comprise one or more optical power supply modules 103 producing continuous-wave (CW) light or producing one or more trains of optical pulses for use in one or more of the optical communication devices of the nodes $101_1$-$101_6$. For illustration purposes, only one such optical power supply module 103 is shown in FIG. 1. A person of ordinary skill in the art will understand that some embodiments may have more than one optical power supply module 103 appropriately distributed over system 100 and that such multiple power supply modules may be synchronized, e.g., using some of the techniques disclosed herein.

Some end-to-end communication paths may pass through an optical power supply module 103 (e.g., see the communication path between nodes $101_2$ and $101_6$). For example, the communication path between nodes $101_2$ and $101_6$ may be jointly established by optical fiber links $102_7$ and $102_8$, whereby light from optical power supply module 103 is multiplexed onto optical fiber links $102_7$ and $102_8$.

Some end-to-end communication paths may pass through one or more optical multiplexing units 104 (e.g., see the communication path between nodes $101_2$ and $101_6$). For example, the communication path between nodes $101_2$ and $101_6$ may be jointly established by optical fiber links $102_{10}$ and $102_{11}$. Multiplexing unit 104 is also connected, through link $102_9$, to receive light from optical power supply module 103 and, as such, may be operated to multiplex said received light onto optical fiber links $102_{10}$ and $102_{11}$.

Some end-to-end communication paths may pass through one or more optical switching units 105 (e.g., see the communication path between nodes $101_1$ and $101_4$). For example, the communication path between nodes $101_1$ and $101_4$ may be jointly established by optical fiber links $102_3$ and $102_{12}$, whereby light from optical fiber links $102_3$ and $102_4$ is either statically or dynamically directed to optical fiber link $102_{12}$.

As used herein, the term "network element" refers to any element that generates, modulates, processes, or receives light within system 100 for the purpose of communication. Example network elements include a node 101, an optical power supply module 103, an optical multiplexing unit 104, and an optical switching unit 105.

Some light distribution paths may pass through one or more network elements. For example, optical power supply module 103 may supply light to node $101_4$ via optical fiber links $102_7$, $102_4$, and $102_{12}$, letting the light pass through network elements $101_2$ and 105.

System 100 may further comprise a control system 106 configured to exchange control signals on links 107 with at least some of the network elements. Control system 106 may perform local or distributed computations based on information received from one or more network elements. In some embodiments, control system 106 may be physically integrated with one or more of network elements. In some embodiments, control system 106 may communicate the results of these computations to one or more network elements. In some configurations, the set of network elements from which the information for the computations is received may be different from the set of network elements to which the corresponding computation results are communicated.

Figure 2:
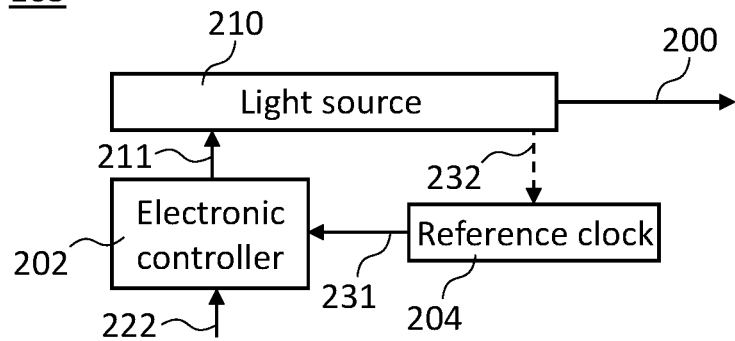
FIG. 2 shows a block diagram of an optical power supply module that can be used in the communication system of FIG. 1 according to an embodiment.

FIG. 2 shows a block diagram of an optical power supply module 103 according to an example embodiment. Optical power supply module 103 comprises a light source 210 and an electronic controller 202. Light source 210 and electronic controller 202 operate to generate a sequence 200 of optical frame templates, each optical frame template of the sequence comprising a frame header and a frame body. Each frame body comprises a respective optical pulse train (e.g., see FIGS. 3 and 5). Electronic controller 202 operates to generate an electrical control signal 211 used by light source 210 to imprint control information onto the light contained within at least some optical frame templates during the respective frame header time periods. The imprinted control information can be used by other network elements of system 100, e.g., as described below in reference to various example embodiments.

As used herein, the term "control information" refers to information imprinted by optical power supply module 103 onto one or more optical frame templates during their respective header time periods, e.g., for controlling, managing, and/or monitoring one or more network elements of system 100, and/or for facilitating various synchronization operations within one or more network elements of system 100. In some embodiments, control information may comprise one or more of: a clock frequency, a clock phase, a synchronization time stamp, a frame delimiter, a frame counter, status information, a heartbeat signal, and a command that may be used to control the behavior of other network elements, such as a master/slave assignment or a reset command. Different types of control information may be imprinted onto the headers of optical frame templates using different features thereof. For example, some types of control information may be imprinted using any suitable data modulation of the light during the time period of the frame header. Some other types of control information may be imprinted using suppression of light within the frame header at and/or for a selected time. Some control information may be imprinted differentially during the header(s) time period(s), i.e., can be recovered by comparing two optical frame templates and using the detected differences between the two frame templates to obtain the control information encoded during the header time period(s) by such differences (see, e.g., FIG. 5D). For example, in some embodiments, electronic controller 202 may generate an electrical control signal 211 that can be used by light source 210 to implement a 180-degree optical phase shift during a header time period, resulting in a 180-degree different optical phase of the optical pulse train contained within the body of an earlier optical frame template compared to the optical pulse train contained within the body of the subsequent optical frame template. In another embodiment, electronic controller 202 may generate an electrical control signal 211 that can be used by light source 210 to implement a 90-degree optical polarization rotation during a header time period, resulting in an orthogonal optical polarization state of the optical pulse train contained within the body of an earlier optical frame template compared to the optical pulse train contained within the body of the subsequent optical frame template.

In some embodiments, electronic controller 202 may receive an input signal 222 from one or more other network elements and/or from control system 106 (also see FIG. 1). In some embodiments, electronic controller 202 may receive a clock reference signal 231 from a reference clock circuit 204. In some embodiments, electronic controller 202 may synchronize electrical control signal 221 with the optical pulse train(s) contained within one or more frame templates using clock reference signal 231. In some embodiments, reference clock circuit 204 may comprise a high-precision clock (such as an atomic clock), a receiver capable of obtaining a reference clock from a Global Positioning System (GPS), or a device with access to a stratum clock in a synchronous optical network. In some embodiments, reference clock circuit 204 may optionally use at least a portion 232 of light generated by light source 210 to generate clock reference signal 231.

Figure 3A:
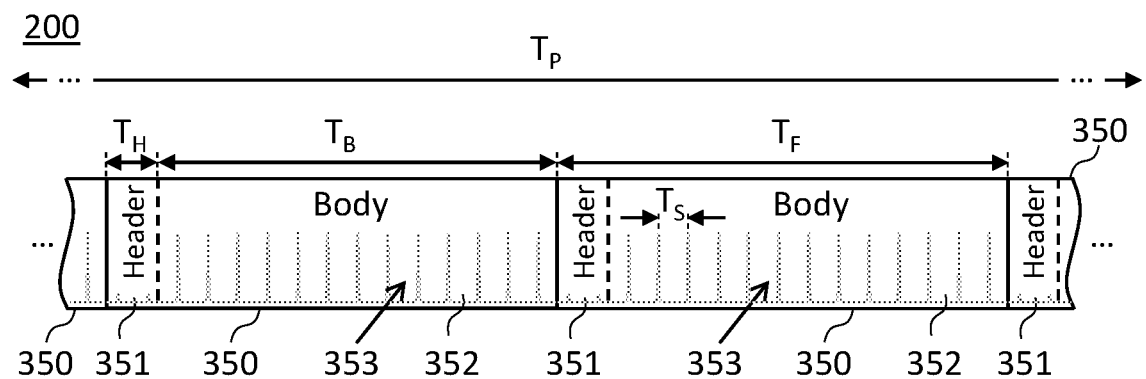
FIGS. 3A-3B graphically illustrate optical frame templates and optical frames that can be generated in the communication system of FIG. 1 according to an example embodiment.
Figure 3B:
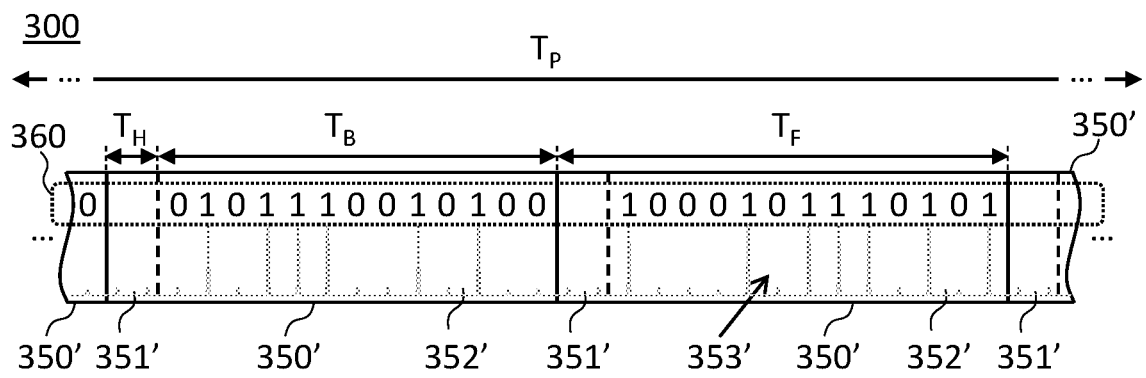

FIGS. 3A-3B graphically illustrate optical frame templates and optical frames that can be generated in communication system 100 according to an example embodiment. More specifically, FIG. 3A graphically illustrates a temporal structure of an example sequence 200 of optical frame templates 350 generated by the optical power supply module 103 of FIG. 2. FIG. 3B graphically illustrates a temporal structure of an example sequence 300 of optical frames 350' that may be generated by a network element of system 100 using optical frame templates 350 of FIG. 3A.

Referring to FIG. 3A, in an example embodiment, each optical frame template 350 has a duration $T_F$. The sequence 200 of frame templates 350 typically has a duration of $T_P \gg T_F$. In some embodiments, $T_P \geq 10\ T_F$. In some other embodiments $T_P \geq 1000\ T_F$. In some embodiments, $T_P$ may be an integer multiple of $T_F$.

Each optical frame template 350 comprises a frame header 351 of duration $T_H$ and a frame body 352 of duration $T_B \gg T_H$, where $T_H + T_B = T_F$. In some embodiments, $T_B \geq 10\ T_H$. In some embodiments, $T_B \geq 100\ T_H$. In some embodiments, $T_B \geq 1000\ T_H$.

The frame body 352 of each optical frame template 350 comprises a respective optical pulse train 353 having a pulse-repetition period $T_S \ll T_F$. In some embodiments, $T_F \geq 10\ T_S$. In some other embodiments, $T_F \geq 1000\ T_S$. In some embodiments, the reciprocal period $1/T_S$ may be equal to the symbol rate of one or more optical signals used for communication by at least some network elements of system 100. In some embodiments, the symbol rate may be at least 10 GBaud, in which case the pulse-repetition period is at most 100 ps. In some embodiments, the duration of an optical frame template $T_F$ may be an integer multiple of the pulse-repetition period $T_S$. In some embodiments, the optical pulse trains 353 of different frame templates may be "frame-synchronized," i.e., the time between the putative start of frame template 350 and the first optical pulse of the respective pulse train 353 of that frame template is the same for all frame-synchronized optical pulse trains 353 of sequence 200.

In some embodiments, the optical pulse trains 353 contained within the respective bodies 352 of a first optical frame template 350 and a second optical frame template 350 may be synchronized with each other. Herein, we refer to two optical pulse trains as being "synchronized with each other" if (i) the optical pulse trains of the first optical frame template and of the second optical frame template have approximately the same pulse-repetition period and (ii) the temporal spacing between the last pulse of the optical pulse train of the first optical frame template and the first pulse of the optical pulse train of the second optical frame template is approximately an integer multiple of said same pulse-repetition period.

In some embodiments, the optical pulse train 353 contained within the body 352 of an optical frame template 350 extends into the corresponding frame header 351.

In some embodiments, the optical pulse trains 353 of the bodies 352 of all optical frame templates 350 of sequence 200 are synchronized with each other and extend across headers 351, thereby forming a "concatenated optical pulse train," e.g., an optical pulse train that spans the full duration of sequence 200. In order for the concatenated optical pulse train to be differentiated into a sequence of optical frame templates, one or more of the parameters P of the optical field of the concatenated optical pulse train may be imprinted with control information during one or more header time periods within the duration of the sequence. In an example embodiment (e.g., see FIG. 3A), $T_S$-spaced optical pulses may be present in each of the frame bodies 352 and possibly in some or all of the corresponding frame headers 351. Some of the frame headers 351 may not contain any optical pulses or have some or all optical pulses suppressed (e.g., significantly attenuated or substantially fully extinguished) therein.

In some embodiments, module 103 may apply one or more changes to one or more parameters P of the optical field of the corresponding optical pulses of trains 353 during one or more frame-header time periods 351. Such changes may be in response to electrical control signal 211 and be configured to imprint the above-mentioned control information that may subsequently be used by one or more network elements of system 100. In various embodiments, different headers 351 within sequence 200 may encode identical or different control information.

During a frame body period 352, optical power supply module 103 typically does not make controllable changes to the corresponding optical pulse train 353 carried therein. For example, the one or more parameters P of the optical field of the optical pulse train 353 may remain substantially constant within one or more frame bodies 352. In general, frame body 352 of an optical frame template 350 is not loaded with (i.e., does not carry) payload data. However, frame body 352 of optical frame template 350 is such that it can conveniently be loaded with payload data, e.g., as described below in reference to FIG. 3B. In that sense, optical frames 350 are "templates" because such optical frame templates already carry light that can conveniently be but is not yet encoded with payload data. Optical frame templates 350 can be converted into conventional optical frames 350' (also referred-to herein as "optical frames" or "loaded optical frames") in a convenient and straightforward manner, e.g., as further described below. Such conversion may include but is not limited to: (i) modulating the portions of optical pulse trains 353 within frame bodies 352 with payload data (referred to herein as "loading" or "data loading" the optical frame template), and (ii) optionally modifying some or all of frame headers 351 to add some selected information that may typically be contained within a conventional frame header 351' of a conventional optical frame 350'.

As used herein, the term "payload data" refers to digital information imprinted onto the frame body by nodes 101 at a symbol rate $R_S$ that is significantly higher than the frame repetition rate $R_F=1/T_F$. In some embodiments, $R_S=1/T_S$. In some embodiments, $R_S \geq 10\ R_F$. Typically, the payload data form the part of the transmitted data that is and/or carries the intended message to the corresponding (e.g., remote) data receiver. Headers and metadata may be sent together with the payload data to enable delivery thereof by the corresponding data-transport system. In the networking arts, the payload data are typically encapsulated in a suitable type of a data frame. Non-limiting examples of such data frames are Ethernet frames, Point-to-Point Protocol (PPP) frames, Fiber Channel frames, and modem frames.

In some embodiments, all frame bodies 352 within sequence 200 are copies of each other. Herein, a first frame body 352 is referred-to as being a "copy" of a second frame body 352 if the optical pulse train 353 contained within the first frame body has approximately the same periodicity as the optical pulse train contained within the second frame body and the optical pulse trains of the first and of the second frame body are frame-synchronized. The typically uncontrollably occurring small fluctuations of the pulse intensity and relative phase and timing jitter are not intended to be construed as affecting said "copy" relationship between such first and second frame bodies 352.

In an example embodiment, the optical pulses of frame headers 351 generated by module 103 may differ from one another by digital changes. As used herein, the term "digital change" refers to a change of the value of parameter P, according to which the resulting value of the parameter P belongs to an alphabet consisting of a finite and discrete set of values. The values of said alphabet may be such that each individual one of the values lends itself to reliable detection by an intended optical receiver in system 100.

In various embodiments, the parameter P may be any one of: intensity, phase, polarization, wavelength (optical frequency), and spatial distribution of light.

As used herein, an "optical pulse train" of period T refers to an optical signal whose intensity is periodic with time period T. In some embodiments, the optical field of an optical pulse train may be periodic with an integer multiple of T, i.e., with a period of n T, where n=1, 2, 3, . . . .

As used herein, the term "periodic" refers to a signal characterized by a parameter or feature (or a change of a parameter or feature) that is repeated every time period T within a duration of time $T_D$, where $T_D$ is significantly larger than T, e.g., $T_D \geq 10$ T. In some cases, the term "periodic" may also be applicable to a signal affected by random noise, random drifts, or small analog dither modulations using one or more sinewave dither tones at frequencies much lower than 1/T, e.g., at frequencies smaller than 1/(1000 T), as long as the effect of noise, drift, or dither is not so strong as to obscure (e.g., make substantially undetectable) the signal periodicity.

Referring to FIG. 3B, in an example embodiment, a sequence 300 of conventional optical frames 350' can be generated from sequence 200 by loading one or more bodies 352 with digital information, e.g., by modulating the corresponding trains 353 with data at symbol rate $1/T_S$, to produce data-modulated bodies 352'. Such data modulation may comprise any of intensity, phase, polarization, or frequency modulation, and any combinations thereof. In the example embodiment graphically illustrated in FIG. 3B, data modulation is performed using binary (e.g., ON/OFF) optical intensity modulation according to a bit stream 360 (which is shown in FIG. 3B as an overlay onto sequence 300).

In the example embodiment illustrated in FIG. 3B, headers 351' of frames 350' are unchanged from headers 351 of the corresponding frame templates 350 and carry frame delimiter control information. In some other embodiments, frame headers 351 of optical frame templates 350 may be modified to generate frame headers 351' of the corresponding optical frames 350'.

Figure 4A:
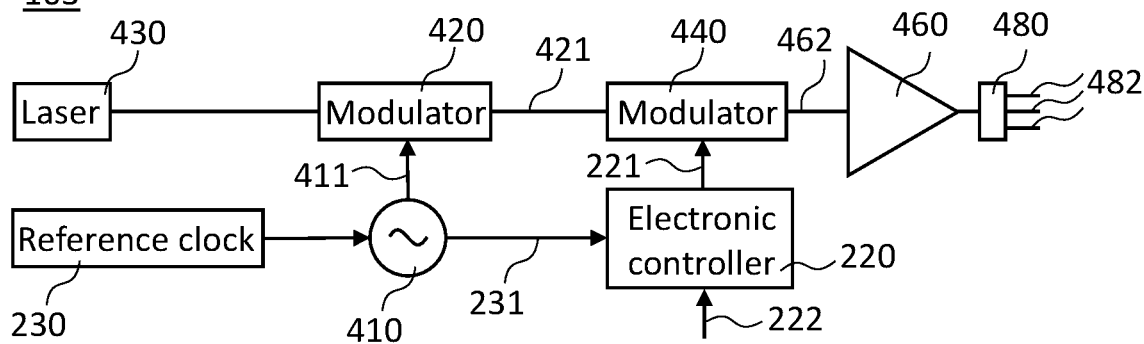
FIGS. 4A-4C show block diagrams of an optical power supply module that can be used in the communication system of FIG. 1 according to several example embodiments.
Figure 4B:
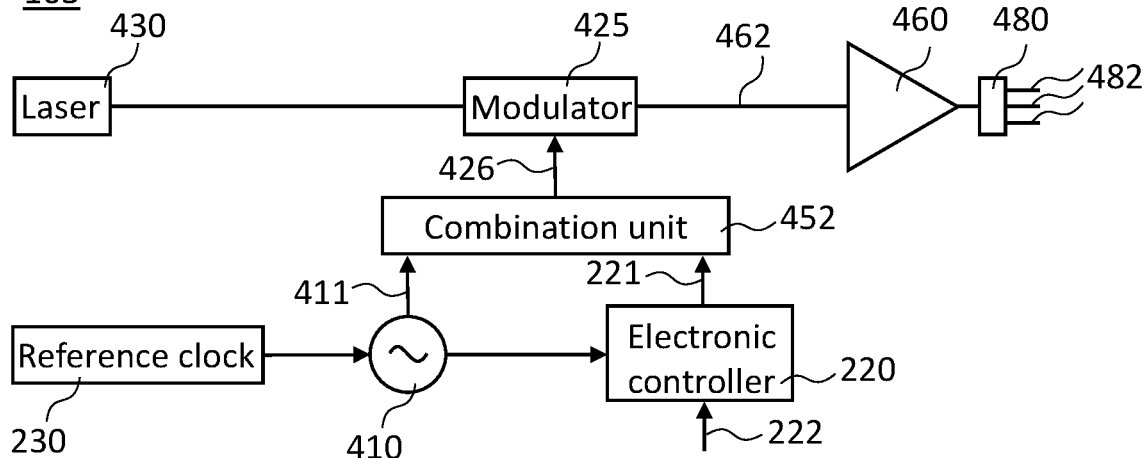
Figure 4C:
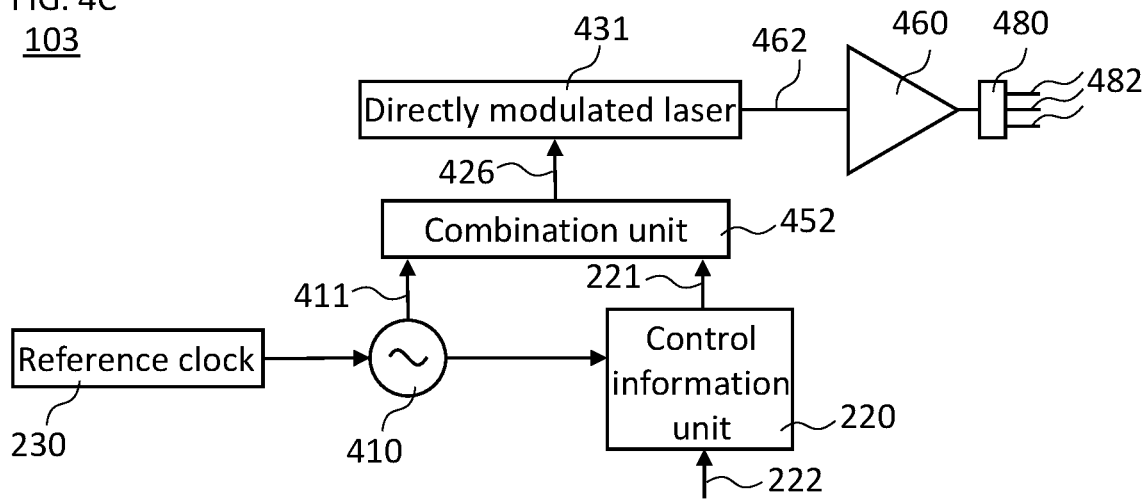

FIGS. 4A-4C show block diagrams of optical power supply module 103 according to several example embodiments.

FIG. 4A shows a block diagram of optical power supply module 103 according to an embodiment. In the embodiment of FIG. 4A, optical power supply module 103 comprises an oscillator 410 configured to generate a periodic electrical waveform 411, e.g., a sinusoidal waveform, a triangular waveform, a rectangular waveform, etc. In some embodiments, oscillator 410 may be phase- and/or frequency-locked to reference clock 230. Oscillator 410 drives a first optical modulator 420 with electrical waveform 411 to modulate light from a CW laser 430 such that the light at an optical modulator output 421 is an optical pulse train of period $T_S$. In some embodiments, electrical waveform 411 may be periodic with period $T_S$. In some other embodiments, electrical waveform 411 may be periodic with an integer multiple of $T_S$, and modulator 420 may cause the period of its output intensity waveform to be shorter (by the integer multiple) than the period of the electrical drive waveform.

In some embodiments, the periodicity of the optical field of the optical pulse train may be periodic with an integer multiple of $T_S$, i.e., with a period of $nT_S$, n=1, 2, 3, . . . . For example, in some embodiments, modulator 420 may be a Mach-Zehnder modulator biased at its transmission peak or a Mach-Zehnder modulator biased at its transmission null, and signal 411 may be sinusoidal with period 2 $T_S$, which may in both cases result in a periodic optical intensity waveform with period $T_S$ at modulator output 421. If the Mach-Zehnder modulator is biased at its transmission null, however, the phase of the optical field may be periodic with period 2 $T_S$.

The optical pulse train at optical modulator output 421 is further modulated by a second optical modulator 440. In different embodiments, modulator 440 may be configured to modulate at least some of intensity, phase, frequency, polarization, or spatial distribution of the optical pulse train at modulator output 421 to produce sequence 200 at an optical modulator output 462. Modulator 440 is driven by electrical signal 221, which is generated by electronic controller 220. Electrical signal 221 may exhibit a digital change during the period of a frame header 351 while remaining at the same digital value during the period of a frame body 352. Some examples of electrical signal 221 and the resulting optical frame templates 200 at an optical modulator output 462 are described in more detail below in reference to FIGS. 5A-5D.

Electrical signal 221 may be autonomously generated within electronic controller 220 or may be at least in part rely on external information 222 provided to electronic controller 220 by other devices or network elements of system 100 or by control system 106. Electronic controller 220 may further accept reference signal 231 from oscillator 410 to synchronize electrical signal 221 with optical pulse train 421.

In some embodiments, one or more optical amplifiers 460 may amplify sequence 200 at an optical modulator output 462. In some embodiments, one or more optical splitters 480 may split sequence 200 into two or more signal portions (e.g., attenuated replica) 482 for output on various links 102.

FIG. 4B shows a block diagram of optical power supply module 103 according to another embodiment. In this particular embodiment, the functions of modulators 420 and 440 are combined into a single optical modulator 425, and electrical outputs 411 and 221 of signal generators 410 and 220 are converted into a single electrical drive signal 426 using an electrical signal combination unit 452. In an example embodiment, signal combination unit 452 may produce an output signal 426 using a weighted sum of signals 411 and 221. In another example embodiment, signal combination unit 452 may produce an output signal 426 using a product of signals 411 and 221.

FIG. 4C shows a block diagram of optical power supply module 103 according to yet another embodiment. In this particular embodiment, CW laser 430 and modulator 425 are replaced by a directly modulated laser 431.

FIGS. 5A-5D graphically illustrate sequence 200 and corresponding electrical control signals 221 according to several example embodiments. At least some of the shown signals 200 and 221 may be generated using some of the circuits shown in FIGS. 4A-4C. Additional circuits that may also be used to generate and/or use at least some of the shown signals 200 and 221 are described below in reference to FIGS. 6A-6C and 7A-7B.

Figure 5A:
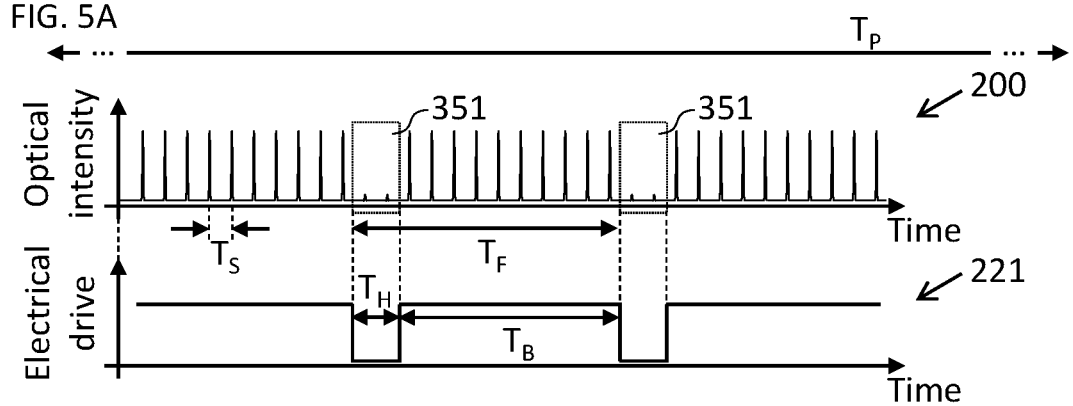
FIGS. 5A-5D graphically illustrate optical frame templates and corresponding electrical drive signals that may be generated in the communication system of FIG. 1 according to some embodiments.

In the embodiment of FIG. 5A, electrical signal 221 digitally changes its value during header time period 351 of approximate duration $T_H \approx 2\ T_S$ within every frame period $T_F \approx 12\ T_S$ and remains constant during the frame body of duration $T_B = T_F - T_H \approx 10\ T_S$. When optical modulator 440 operates as an intensity modulator, the electrical signal 221 shown in the lower panel of FIG. 5A results in the intensity waveform of sequence 200 shown in the upper panel of FIG. 5A.

In some embodiments, electrical signal 221 may remain constant for a frame body of duration $T_B \geq 100\ T_S$. In some other embodiments, electrical signal 221 may remain constant for a frame body of duration $T_B \geq 1000\ T_S$.

As shown in FIG. 5A, different headers may carry the same control information, which in this example embodiment corresponds to frame delimiters.

Figure 5B:
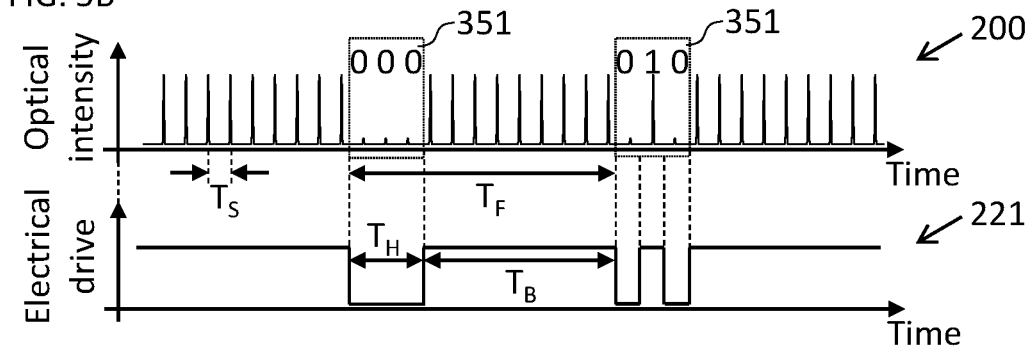

In the embodiment of FIG. 5B, electrical signal 221 may digitally change its value during header time period 351 of approximate duration $T_H \approx 3\ T_S$ within every frame period $T_F \approx 12\ T_S$ and remain constant during the frame body of duration $T_B = 9\ T_S$. When optical modulator 440 operates as an intensity modulator, the electrical signal 221 shown in the lower panel of FIG. 5B results in the intensity waveform of sequence 200 shown in the upper panel of FIG. 5B.

As indicated in FIG. 5B, different headers 351 may carry different control information. In the shown non-limiting example, one header 351 carries the binary word '0 0 0' while another header 351 carries the binary word '0 1 0'. The preset logical meaning of such differently modulated headers may be used within system 100 as control information, e.g., as frame identifiers, frame counters, synchronization time stamps, or to convey status information from optical power supply module 103 to one or more network elements.

Figure 5C:
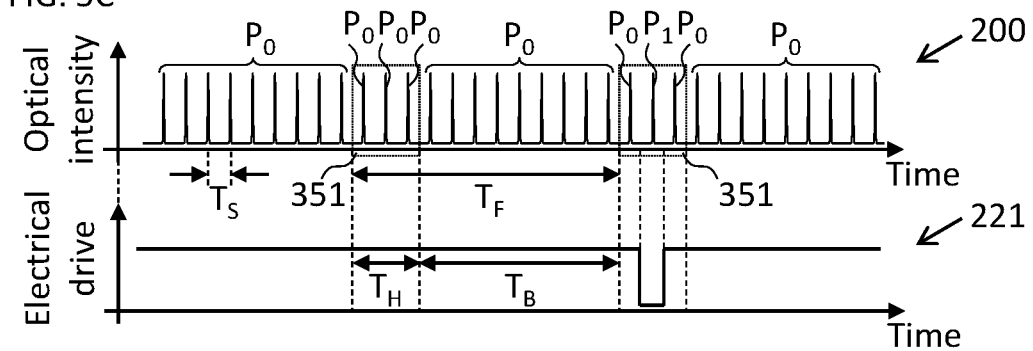

In the embodiment of FIG. 5C, electrical signal 221 may digitally change its value during some header time periods 351 of approximate duration $T_H \approx 3\ T_S$ within frame periods $T_F \approx 12\ T_S$ and remain constant during the frame bodies of duration $T_B = 9\ T_S$. When optical modulator 440 operates to modulate the parameter P of the light passing therethrough, the electrical signal 221 shown in the lower panel of FIG. 5C results in the sequence 200 having the infrequent changes of the parameter P indicated in the upper panel of FIG. 5C. In various embodiments, the parameter P may be any one of: intensity, phase, polarization, wavelength (optical frequency), and spatial distribution of light. In such embodiments, modulator 440 is an intensity modulator, a phase modulator, a polarization modulator, a frequency shifter, and a spatial light modulator, respectively.

While the example shown in FIG. 5C illustrates binary modulation of the parameter P between two values $P_0$ and $P_1$, other numbers of possible values of the parameter P may also be realized in some embodiments. For example, modulator 440 may be configured to imprint three or more different digital values of the parameter P in different modulation time slots. Furthermore, in some embodiments, modulator 440 may be configured to cause corresponding changes of two or more different parameters P (e.g., phase and intensity; or optical frequency and polarization; or phase, intensity, and optical frequency; or phase, intensity, optical frequency, and polarization).

Figure 5D:
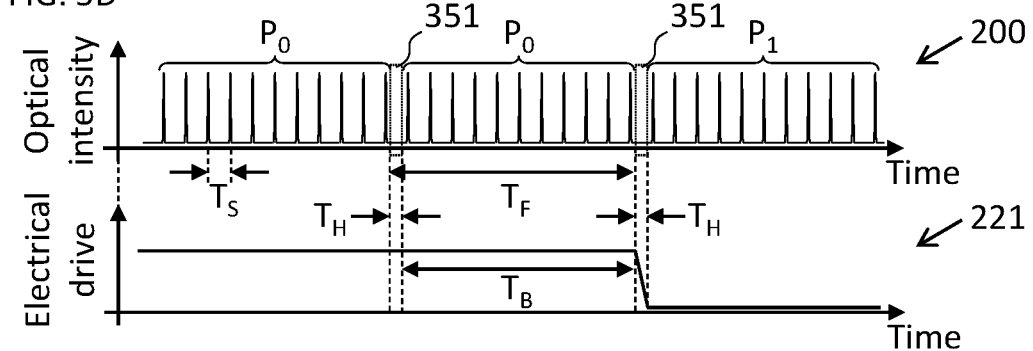

In the embodiment of FIG. 5D, electrical signal 221 may remain substantially constant for one or more frame body periods of $T_B \approx 10.4\ T_S$ and may digitally change its value during at least one header time period 351 of $T_H \approx 0.6\ T_S$. When optical modulator 440 operates to modulate the parameter P of the light passing therethrough, the electrical signal 221 shown in the lower panel of FIG. 5D results in the sequence 200 having the infrequent changes of the parameter P indicated in the upper panel of FIG. 5D. In various embodiments, the parameter P may be any one of: intensity, phase, polarization, wavelength, or spatial distribution of light. While the example shown in FIG. 5D illustrates binary modulation of the parameter P between two values $P_0$ and $P_1$, more than two values of the parameter P may be used, e.g., as already indicated above in reference to FIG. 5C. Furthermore, in some embodiments, modulator 440 may be configured to cause corresponding changes of two or more different parameters P, e.g., as also indicated above in reference to FIG. 5C.

Figure 6A:
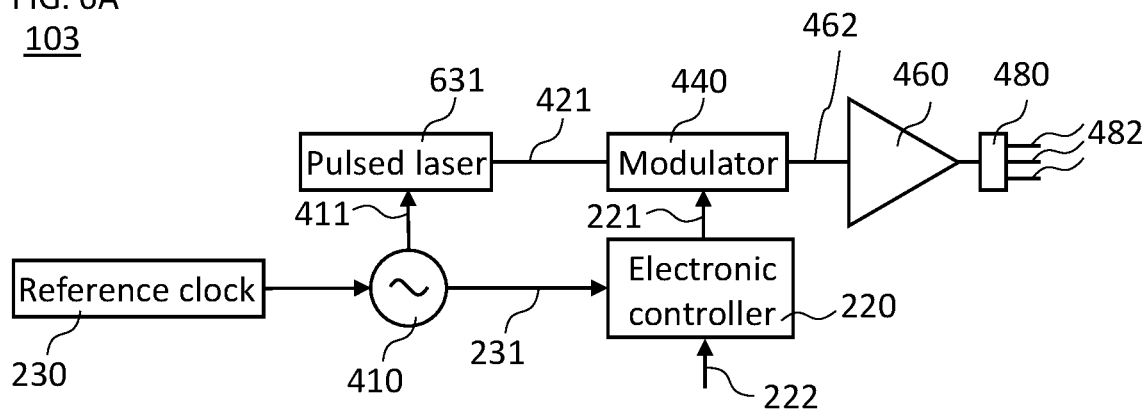
FIGS. 6A-6C show block diagrams of an optical power supply module that can be used in the communication system of FIG. 1 according to several additional embodiments.
Figure 6B:
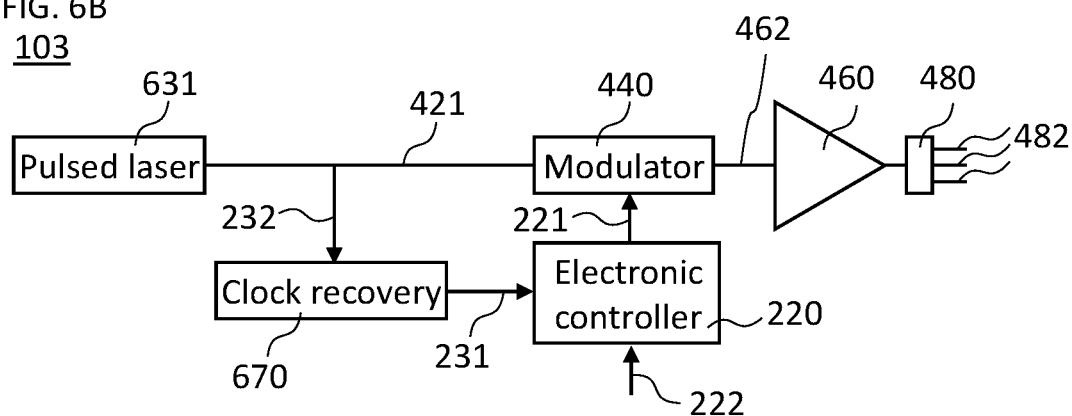
Figure 6C:
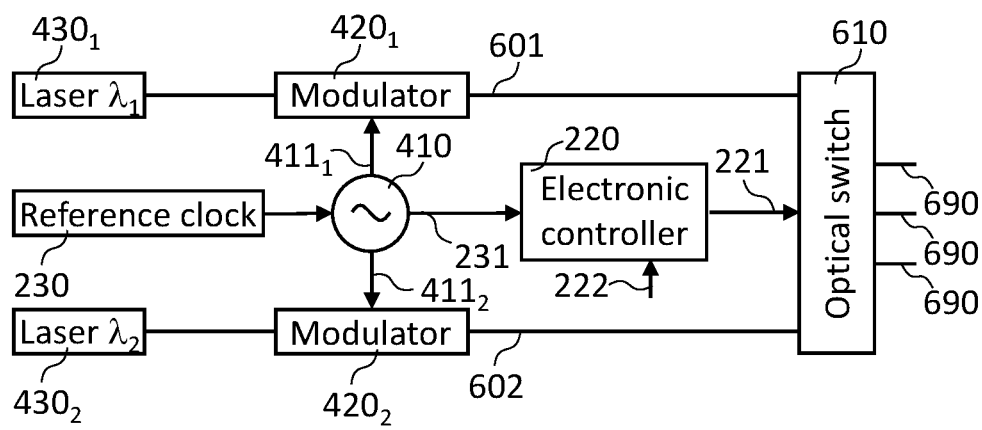

FIGS. 6A-6C show block diagrams of optical power supply module 103 according to additional example embodiments.

In the embodiment shown in FIG. 6A, oscillator 410 is used to drive a pulsed laser 631 to produce an optical waveform that is periodic in its optical intensity with period $T_S$ at the optical output 421. In some embodiments, pulsed laser 631 may be a directly modulated laser whose pump current is modulated in response to electrical waveform 411. In some other embodiments, pulsed laser 631 may be an actively mode-locked laser. In yet some other embodiments, pulsed laser 631 may be a hybrid mode-locked laser. In some embodiments, electrical waveform 411 may be periodic with period $T_S$. In some other embodiments, pulsed laser 631 may, upon modulation, produce an optical output whose intensity waveform has a different period (e.g., by an integer multiplication or division factor) than the corresponding electrical waveform 411. For example, in some embodiments, pulsed laser 631 may be a sub-harmonically driven mode-locked laser.

The optical pulse train at pulsed laser output 421 is further modulated by modulator 440. Modulator 440 may modulate any of intensity, phase, frequency, polarization, or spatial distribution of the optical pulse train at pulsed laser output 421 to produce a sequence 200 at modulator output 462. Modulator 440 may be driven by electrical signal 221, as discussed by way of examples in reference to FIGS. 4-5.

In some embodiments, one or more optical amplifiers 460 may amplify the light of sequence 200 at modulator output 462. In some embodiments, one or more optical splitters 480 may split signal 462 into two or more signal portions 482 for being directed to various links 102.

In some embodiments, pulsed laser 631 and modulator 440 may be replaced by a single directly-modulated laser, and signals 411 and 221 may be suitably combined by a signal combination unit to generate a single electrical signal directly driving said directly-modulated laser, e.g., as described in reference to FIG. 4C.

In the embodiment shown in FIG. 6B, pulsed laser 631 may be a passively mode-locked laser that generates an optical waveform that is periodic with respect to its optical intensity with period $T_S$ at pulsed laser output 421. A clock recovery circuit 670 operates to recover the frequency and/or phase of the periodic intensity waveform using the light from tapped pulsed laser output 232. The resulting clock signal 231 may then be used by electronic controller 220, e.g., as described in reference to FIG. 4A.

In the embodiment shown in FIG. 6C, oscillator 410 is used to generate periodic electrical waveforms $411_1$ and $411_2$. In some embodiments, oscillator 410 may be locked to reference clock 230. Oscillator 410 drives optical modulators $420_1$ and $420_2$ with electrical waveforms $411_1$ and $411_2$, respectively, which are connected to modulate light from CW lasers $430_1$ and $430_2$ operating at different respective wavelengths $\lambda_1$ and $\lambda_2$ such as to produce optical waveforms that are periodic with respect to their optical intensities with period $T_S$ at modulator outputs 601 and 602. In some embodiments, the optical frequency separation of the two CW lasers $|f_1-f_2|$ is at least $1/T_S$, where $f_1=c/\lambda_1$ and $f_2=c/\lambda_2$, c being the speed of light in the medium in which the wavelengths are measured. In some embodiments, the phase difference between the two electrical waveforms $411_1$ and $411_2$ may be chosen such as to synchronize modulator outputs 601 and 602, e.g., by letting the corresponding pulses of the waveforms at modulator outputs 601 and 602 overlap in time. In some embodiments, the two combinations of CW lasers 430 and modulators 420 may be replaced by two directly modulated lasers or by two mode-locked lasers.

Optical pulse trains at modulator outputs 601 and 602 are input to an optical switch 610. Optical switch 610 is driven by electrical signal 221, which is generated by electronic controller 220, e.g., as described above. Optical switch 610 respectively switches one of its inputs 601 or 602 to one or more of its outputs 690 based on electrical signal 221. One or more outputs 690 may be directed to one or more links 102.

Figure 7A:
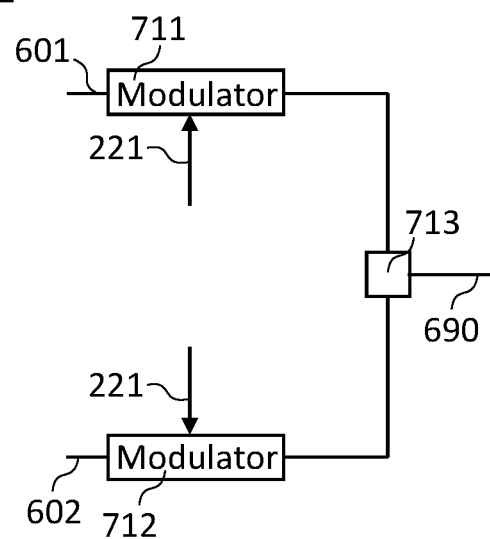
FIGS. 7A-7B show block diagrams of an optical switch that can be used in the optical power supply module of FIG. 6C according to some embodiments.
Figure 7B:
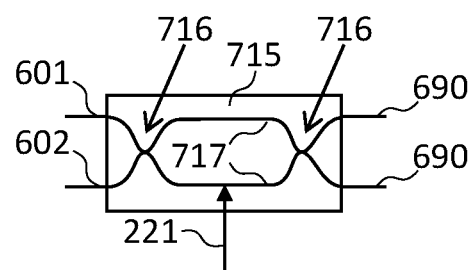

FIGS. 7A-7B show block diagrams of optical switch 610 according to some example embodiments.

In the embodiment of FIG. 7A, optical switch 610 comprises two on/off intensity modulators 711 and 712, followed by an optical coupler 713. In some embodiments, on/off intensity modulators 711 and 712 may be selected from any of: electro-absorption modulators, ring modulators, and Mach-Zehnder modulators. In operation, modulators 711 and 712 may be driven out-of-phase with respect to one another by electrical signals 221, i.e., modulator 711 lets light pass from its input to its output whenever modulator 712 blocks light from its input to its output, and vice versa.

In the embodiment of FIG. 7B, optical switch 610 comprises a Mach-Zehnder optical modulator 715 with two input ports 601 and 602 and two output ports 690. Mach-Zehnder optical modulator 715 comprises input and output power splitters 716 connected by optical waveguides 717. Electrical signal 221 is applied to appropriately modulate the optical phase difference between waveguides 717, thereby switching optical signal 601 to the upper output 690 and signal 602 to the lower output 690 and vice versa.

Figure 8:
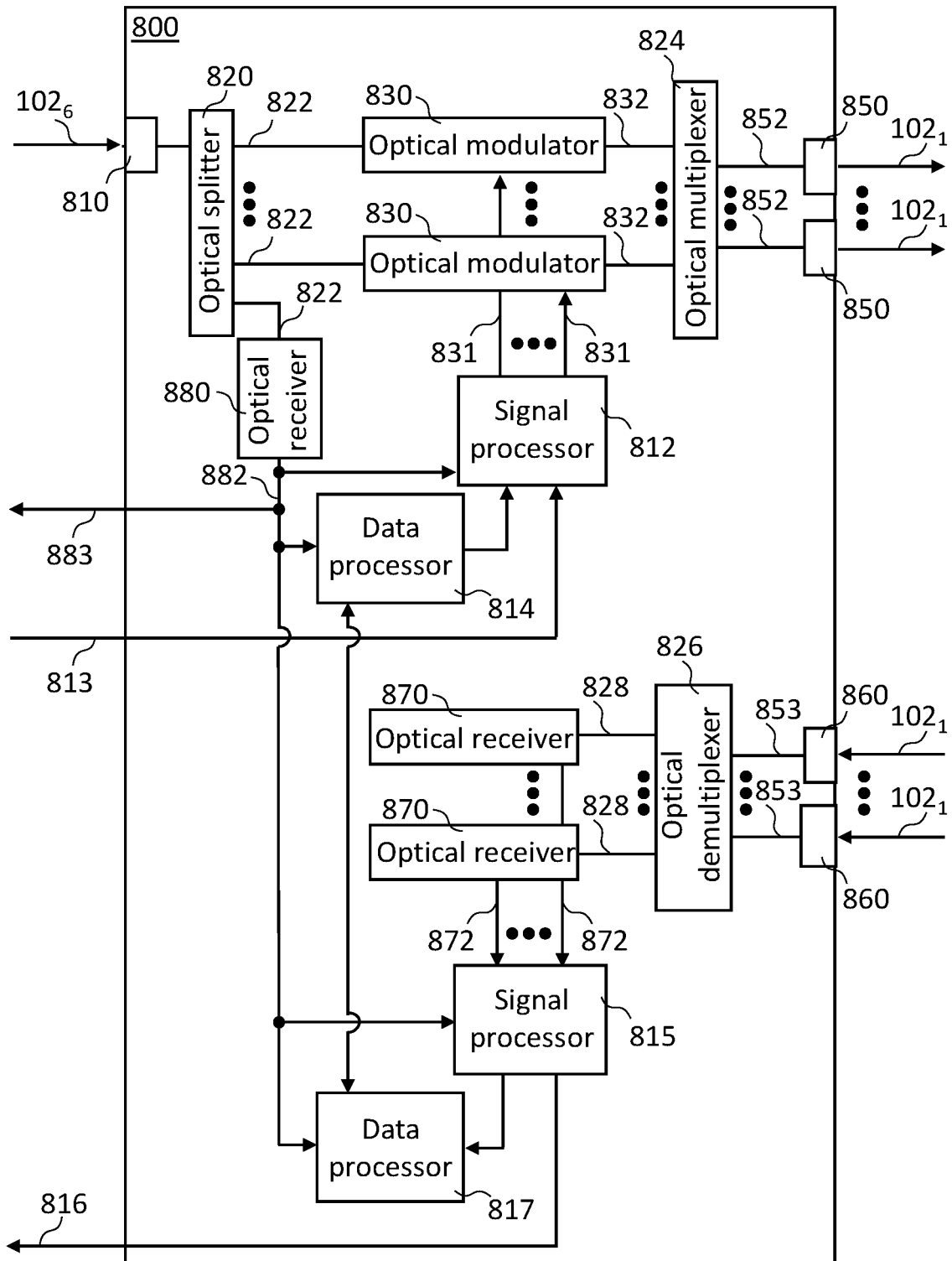
FIG. 8 shows a block diagram of a synchronizing communication transponder that can be used in the communication system of FIG. 1 according to an embodiment.

FIG. 8 shows a block diagram of a synchronizing communication transponder 800 that can be used in system 100 according to an embodiment. In different embodiments, transponder 800 may be a part of various network elements of system 100. For illustration purposes and without any implied limitation, transponder 800 is described below for an embodiment in which said transponder is a part of node $101_1$.

In operation, transponder 800 receives one or more sequences 200 from optical power supply module 103 via an optical interface 810 connected to optical link $102_6$ (also see FIG. 1). In some embodiments, optical interface 810 may comprise one or more optical connectors, one or more edge-coupling mechanisms to a photonic integrated circuit (PIC), one or more vertical coupling mechanisms to a PIC, etc. In an example embodiment, optical interface 810 may be connected to one or more (e.g., cascaded) optical splitters 820, only one of which is shown in FIG. 8 for illustration purposes. In various embodiments, an optical splitter 820 may be constructed, e.g., as known in the pertinent art, using one or more of: optical power splitters, wavelength splitters, polarization splitters, and spatial-distribution splitters, such as spatial-mode splitters or multi-core-fiber fanouts. In some embodiments, one or more of certain splitting functions of optical splitter 820 may be integrated into optical interface 810. For example, in some embodiments, a polarization-diversity vertical grating coupler may be configured to simultaneously act as a polarization splitter of optical splitter 820 and as a part of an optical interface 810.

Opto-electronic modulators 830 receive sequence(s) 200 on optical splitter outputs 822 and modulate data onto the pulses contained within bodies 352 of optical frame templates 350 using one or more electrical drive signals 831 to produce optical frames 350' on modulator outputs 832. In some embodiments, modulation may be done in intensity, phase, polarization, or frequency. In some embodiments, modulation may be done at a modulation symbol rate $1/T_S$.

In some embodiments, one or more modulators 830 may at times not modulate information onto optical frame templates 350. Alternatively or in addition, one or more of the shown modulators 830 may be omitted from (i.e., not present in) the structure of transponder 800. In such cases, optical frame templates 350 may be passed through transponder 800 on to other network elements of system 100, in accordance with the above-provided functional description of some aspects of system 100 (FIG. 1). In some embodiments, some of such passed-on optical frame templates 350 may be used by other network elements of system 100 as an optical power supply to imprint payload information and convert optical frame templates 350 into the corresponding loaded optical frames 350' thereat. In some embodiments, some of such passed-on optical frame templates 350 may be received by other network elements of system 100 to extract control information therefrom.

In some embodiments, some modulators 830 may be configured to use more than one electrical drive signal 831 to modulate light received at the corresponding input 822. Examples of such modulators 830 include but are not limited to in-phase/quadrature modulators and segmented-electrode modulators. In various embodiments, opto-electronic modulators 830 may be electro-absorption modulators, ring modulators, or Mach-Zehnder modulators. In various embodiments, opto-electronic modulators 830 may be made of semiconductor materials, materials used in Silicon Photonics, polymer materials, or Lithium Niobate. In some embodiments, opto-electronic modulators 830 may at least partially be integrated in one or more PICs (not explicitly shown in FIG. 8). In various embodiments, electrical drive signals 831 may be binary or multilevel. In some embodiments, electrical drive signals 831 may be suitably pulse-shaped or may be pre-distorted using digital or analog filters, or may be electrically amplified using electrical driver amplifiers.

In some embodiments, some of the sequence(s) 200 on optical splitter outputs 822 may be detected using one or more optical receivers 880 to extract information contained therein. Such information may be output on receiver output(s) 882. Such information may include, without limitation, one or more frequency components, one or more time skew or clock phase values, and one or more pieces of control information embedded within the sequence(s) 200.

In some embodiments, information extracted by optical receivers 880 may be provided to devices external to transponder 800 on output port 883 for further use within system 100, e.g., for use within control system 106, such as for network traffic synchronization/arbitration/scheduling, database time-stamping, local clock synchronization, etc. In some embodiments, information extracted by optical receivers 880 may be fed into an electronic signal processor 812 and/or a data processor 814. In some embodiments, electronic signal processor 812 may receive one or more signals 813 from external devices and/or data from data processor 814 and may pre-process those to generate electrical drive signals 831 for modulators 830. In some embodiments, pre-processing may comprise any form of analog, digital, or mixed-signal manipulation, including but not limited to retiming, de-skewing, buffering, bit stuffing, bit removal, forward error correction coding, line coding, framing, the insertion of pilots and packet headers, time-stamping, linear and nonlinear pre-compensation, pre-equalization, pre-emphasis, and pre-distortion.

In some embodiments, sequences 300 of optical frames 350' on modulator outputs 832 may be multiplexed in wavelength, polarization, or spatial distribution of the optical field using one or more multiplexers 824 to generate one or more optical multiplexed signals 852. Multiplexed signals 852 may then be transmitted via one or more output interfaces 850 to one or more optical fibers 102₁. In some embodiments, output interfaces 850 may be implemented, e.g., as one or more optical fiber connectors, one or more edge couplers from PIC to fibers, or one or more vertical couplers from PIC to fibers. In some embodiments, certain multiplexing functions of multiplexer 824 may be integrated into certain output interfaces 850. For example, a polarization-diversity vertical grating coupler may simultaneously act as a polarization multiplexer of multiplexer 824 and as a part of an output interface 850.

In some embodiments, each modulator output 832 may be passed directly to a corresponding optical fiber or to a corresponding optical fiber core of fiber link 102₁ via a corresponding output interface 850, i.e., without undergoing any multiplexing therebetween. In other words, multiplexer 824 or some parts thereof may not be present in some embodiments.

Transponder 800 may further comprise input interfaces 860 connected to receive one or more optical signals 853 that may be of the same general form as signals 852. In some embodiments, input interfaces 860 may be implemented similar to output interfaces 850, e.g., using one or more optical fiber connectors, one or more edge couplers from PIC to fibers, or one or more vertical couplers from PIC to fibers. In some embodiments, input interfaces 860 may be connected to one or more optical demultiplexers 826 to demultiplex signals 853 into their constituent components, e.g., into one or more of wavelengths, polarizations, or spatial distributions of the optical field, to yield demultiplexed signals 828. Demultiplexed sequences of optical frames 350' at demultiplexer outputs 828 may be converted from optical to electrical form using optical receivers 870 to produce electrical signals 872.

In some embodiments, certain demultiplexing functions of demultiplexer 826 may be integrated into certain input interfaces 860. For example, a polarization-diversity vertical grating coupler may simultaneously act as a polarization demultiplexer of demultiplexer 826 and as a part of an input interface 860.

In some embodiments, each optical signal 853 may be passed directly to a corresponding optical data receiver 870 from a corresponding input interface 860, i.e., without undergoing any demultiplexing therebetween. In other words, demultiplexer 826 or some parts thereof may not be present in some embodiments.

In some embodiments, electrical signals 872 may be further processed using an electronic signal processor 815. In some embodiments, electronic signal processor 815 may process electrical signals 872 to generate one or more electrical data signals 816. In some embodiments, electronic signal processor 815 may further accept information 882 extracted from the sequence(s) 200 by optical receivers 880. In some embodiments, electronic signal processing may comprise any form of analog, digital, or mixed-signal manipulations, including but not limited to linear and non-linear equalization, clock recovery, retiming, de-skewing, buffering, forward error correction decoding, line decoding, de-framing, pilot removal, and the inspection and manipulation of packet headers.

In some embodiments, electronic signal processor 815 may produce data for further electronic processing by data processor 817. In some embodiments, data processor 817 may further accept information 882 extracted from the sequence(s) 200 by optical receivers 880.

FIGS. 9A-9D show block diagrams of optical receiver 880 according to some example embodiments. The circuits shown in FIGS. 9A-9D can also be used to implement various embodiments of optical receiver 870. For simplicity, the following description is given primarily in reference to optical receiver 880. From the provided description, a person of ordinary skill in the art will also be able to make and use optical receiver 870 without any undue experimentation.

Figure 9A:
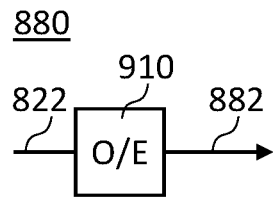
FIGS. 9A-9D show block diagrams of an optical receiver that can be used in the synchronizing communication transponder of FIG. 8 according to some embodiments.

In the embodiment illustrated in FIG. 9A, optical receiver 880 comprises an optical-to-electrical (O/E) conversion device 910 configured to convert optical signal 822 into a corresponding electrical output signal 882. In various embodiments, O/E conversion device 910 may comprise one or more p-i-n photodiodes, one or more avalanche photodiodes, one or more self-coherent receivers, or one or more analog (heterodyne/homodyne) or digital (intradyne) coherent receivers. In some embodiments, O/E conversion device 910 may further comprise analog electronic circuitry, digital electronic circuitry, mixed-signal electronic circuitry, or digital electronic signal processing functions to assist in O/E conversion, such as electronic biasing circuits, electronic monitoring circuits, trans-impedance amplifiers, digital or analog linear or nonlinear equalization circuits, and various other receiver digital signal processing elements. In some embodiments, O/E conversion device 910 may at least partially be integrated in one or more PICs (not explicitly shown in FIG. 9A).

Figure 9B:
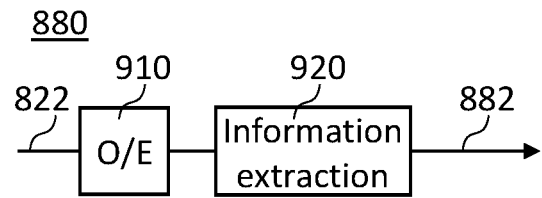

In the embodiment illustrated in FIG. 9B, O/E conversion device 910 is connected to information extraction device 920. In some embodiments, information extraction device 920 may comprise one or more electrical bandpass filters centered approximately at a characteristic frequency components contained in optical frame template 350 on receiver input 822, such as a main clock frequency $1/T_S$ or a main framing frequency $1/T_F$. In some embodiments information extraction device 920 may comprise a phase-locked loop. In some embodiments, information extraction device 920 may output one or more electrical sine wave signals at said characteristic frequencies, multiples thereof, or sub-harmonics thereof. In some embodiments, information extraction device 920 may comprise frame detection circuitry that examines the received framed optical pulse train and/or modulated framed optical pulse train for one or more missing pulses occurring periodically at period $T_F$ (e.g., 351, FIG. 5A) and may output on receiver output 882 synchronization pulses coinciding, e.g., with the start of each frame.

In some embodiments, information extraction device 920 may comprise header detection circuitry that examines the received signal for periodically inserted headers occurring at period $T_F$ (e.g., 351, FIG. 5A) and may output on receiver output 882, e.g., at times coinciding with the end of each header, a synchronization pulse as well as the respective value contained within the header. In some embodiments, the header may comprise the value of a timestamp counter. In some embodiments, the header may comprise state information about system 100 such as one or more logical addresses, one or more pieces of diagnostic information, etc. In some embodiments, the header may comprise control information from system 100 such as one or more reset requests, one or more master/slave assignments directed to one or more network elements of system 100, etc.

Figure 9C:
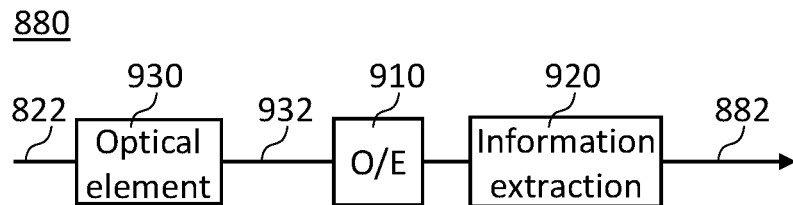

In the embodiment illustrated in FIG. 9C, O/E conversion device 910 is preceded by an optical element 930 configured to convert variously received optical frame templates 350 (or, in the case of receiver 870, loaded optical frames 350') that are encoded using parameters P of the optical field (e.g., polarizations, wavelengths, or spatial distributions) into corresponding intensity-modulated optical signal(s) 932 detectable using direct intensity detection. In some embodiments, parameters P may comprise one or more polarization states, in which case optical element 930 may comprise one or more polarizers or polarizing beam splitters. In some embodiments, parameters P may comprise various phases of the optical field, in which case optical element 930 may comprise one or more optical delay interferometers. In some embodiments, parameters P may comprise various wavelengths, in which case optical element 930 may comprise one or more optical filters. In some embodiments, parameters P may comprise various spatial modes, in which case optical element 930 may comprise one or more spatial-mode demultiplexers. The respectively pertinent choice of various optical elements to be used to convert framed optical pulse trains and/or modulated framed optical pulse trains using various parameters P to signals suitable for direct intensity detection will be understood by a person of ordinary skill in the art.

Figure 9D:
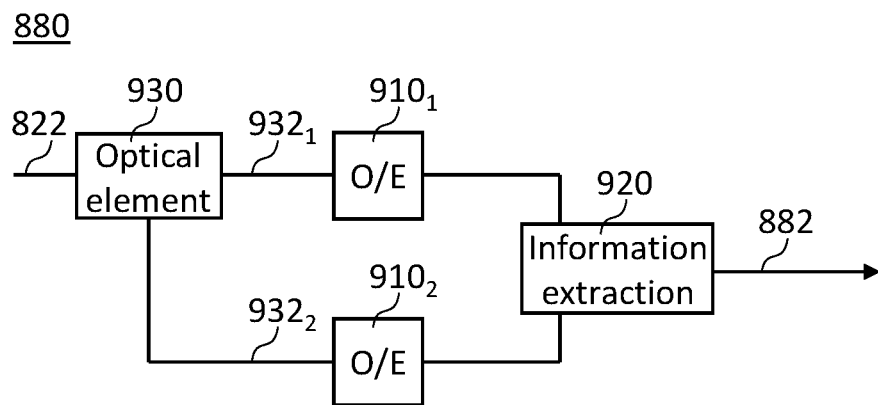

In the embodiment illustrated in FIG. 9D, various parameters P may comprise two or more optically separable parameter states, such as two orthogonal polarizations, two opposite optical phases, two or more orthogonal frequencies, or two or more orthogonal spatial modes. In such embodiments, optical element 930 may split variously encoded received optical frame templates 350 (or, in the case of receiver 870, loaded optical frames 350') into their separable parameter components, e.g., parameter component $932_1$ and $932_2$ for individual detection using two or more O/E conversion devices, e.g., $910_1$ and $910_2$. In some embodiments, parameters P may comprise various polarization states, in which case optical element 930 may comprise a polarizing beam splitter with two or more output ports. In some embodiments, parameters P may comprise various phases of the optical field, in which case optical element 930 may comprise one or more optical delay interferometers with two or more output ports. In some embodiments, parameters P may comprise various wavelengths, in which case optical element 930 may comprise a wavelength demultiplexer with two or more output ports. In some embodiments, parameters P may comprise various spatial modes, in which case optical element 930 may comprise a spatial-mode demultiplexer with two or more output ports. In some embodiments information extraction device 920 may comprise one or more difference functions to implement balanced detection.

Figure 10A:
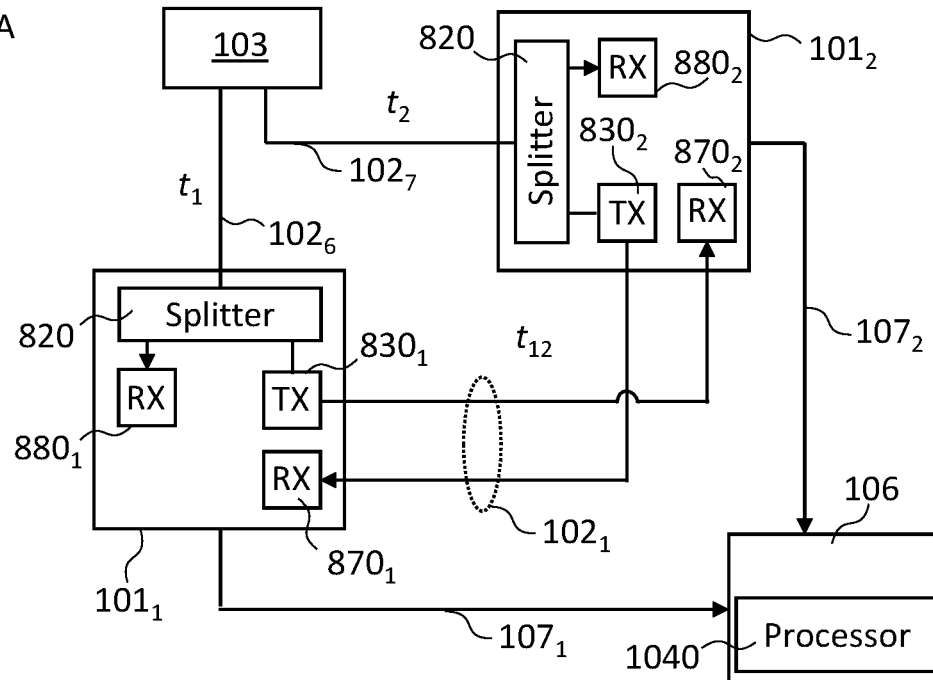
FIGS. 10A-10B illustrate a system and a method, respectively, for synchronization of various network elements that can be used in the communication system of FIG. 1 according to an embodiment.
Figure 10B:
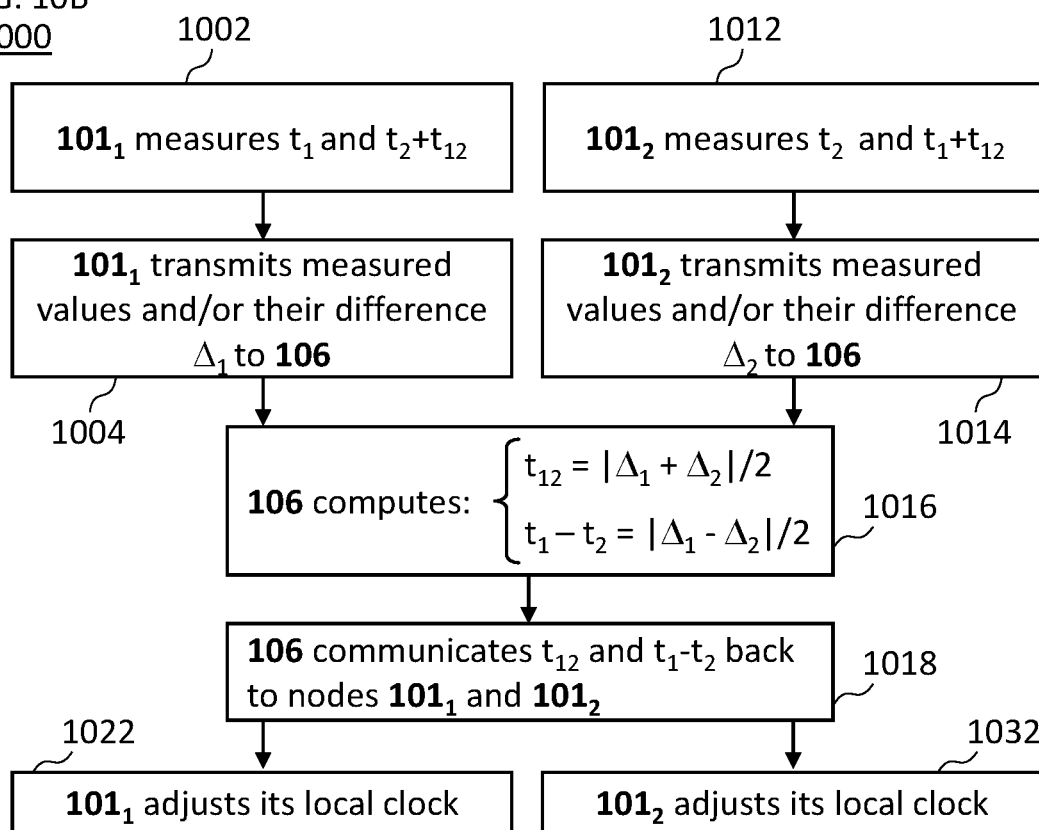

FIGS. 10A-10B illustrate a system 1001 and a method 1000, respectively, that can be used for synchronization of various network elements of system 100. In an example embodiment, system 1001 is a part of system 100, as indicated by the common reference numerals used in FIGS. 1 and 10A.

FIG. 10A shows a bock diagram of system 1001 according to an embodiment. As shown, system 1001 includes network elements 101$_1$, 101$_2$, 103, and control system 106 (also see FIG. 1) including a processor 1040. In operation, optical power supply module 103 of system 1001 produces a sequence 200 of optical frame templates 350 comprising framing information (e.g., 351, FIG. 5A) and/or one or more time stamps (e.g., 351, FIG. 5B) and supplies (attenuated) replica of said sequence(s) 200 to nodes 101$_1$ and 101$_2$ via links 102$_6$ and 102$_7$, respectively. Optical receiver (RX) 880$_1$ of node 101$_1$ extracts a frame delimiter or time stamp T$_0$ from the sequence 200 received from node 103 on link 102$_6$ and records its local time $t_1$ coinciding with the extracted time stamp T$_0$. Optical receiver 880$_2$ of network element 101$_2$ extracts the same time stamp T$_0$ from the sequence 200 received from node 103 on link 102$_7$ and records its local time $t_2$ coinciding with the extracted frame delimiter or time stamp T$_0$.

In one embodiment, in order to extract a frame delimiter or a timestamp from the sequence 200, optical receiver 880 examines the received signal for features that periodically occur at the known frame rate $1/T_F$, such as one or more missing optical pulses (e.g., 351, FIG. 5A) or a periodically occurring counter value that increases each $T_F$ (e.g., 351, FIG. 5B). Once a few (e.g., 3, 5, or 10) occurrences of an expected pattern at rate $1/T_F$ have been detected during a start-up phase of operation, optical receiver 880 is synchronized with the frame rate and is able to properly record its local time at which each subsequent frame delimiter or synchronization timestamp occurs.

Optical transmitter (TX) 830$_2$ of node 101$_2$ uses a replica of the sequence of nascent optical frames received on link 102$_7$ as an optical power supply to modulate onto its frame bodies information destined to node 101$_1$. Optical receiver 870$_1$ of network element 101$_1$ receives said sequence of modulated optical frames, extracts time stamp T$_0$, and records its local time $t_1+t_{12}$ coinciding with time stamp T$_0$. Similarly, optical transmitter 830$_1$ of node 101$_1$ uses a replica of said sequence of nascent optical frames received on link 102$_6$ as an optical power supply to modulate onto its frame bodies information destined to node 101$_2$. Optical receiver 870$_2$ of network element 101$_2$ receives said sequence of modulated optical frames, extracts time stamp T$_0$, and records its local time $t_2+t_{12}$ coinciding with time stamp T$_0$.

Node 101$_1$ communicates its recorded local times $t_1$ and $t_2+t_{12}$ and/or its recorded local time difference $\Delta_1=t_1-(t_2+t_{12})$ to processor 1040 of control system 106 on link 107$_1$. Node 101$_2$ communicates its recorded local times $t_2$ and $t_1+t_{12}$ and/or its recorded local time difference $\Delta_2=t_2-(t_1+t_{12})$ to processor 1040 of control system 106 on link 107$_2$.

FIG. 10B shows a flow chart of a synchronization method 1000 according to an embodiment.

At steps 1002 and 1012, nodes 101$_1$ and 101$_2$, respectively, measure locally recorded times $\{t_1, t_2+t_{12}\}$ and $\{t_2, t_1+t_{12}\}$ and, at steps 1004 and 1014, communicate these measurements and/or their recorded local time differences $\Delta_1$ and $\Delta_2$ to processor 1040 of control system 106.

At step 1016, processor 1040 of control system 106 calculates the sum of $\Delta_1$ and $\Delta_2$ as $\Sigma_{12}=\Delta_1+\Delta_2=2t_{12}$ and the difference of $\Delta_1$ and $\Delta_2$ as $\Delta_{12}=\Delta_1-\Delta_2=2(t_1-t_2)$ and thereby acquires knowledge of the communication delay $t_{12}$ between nodes 101$_1$ and 101$_2$ as well as of the propagation delay difference $(t_1-t_2)$ between optical power supply module 103 and, respectively, nodes 101$_1$ and 101$_2$.

At step 1018, processor 1040 of control system 106 communicates the calculated communication delay $t_{12}$ between nodes 101$_1$ and 101$_2$ as well as the propagation delay difference $(t_1-t_2)$ between optical power supply module 103 and, respectively, nodes 101$_1$ and 101$_2$, back to nodes 101$_1$ and 101$_2$.

At steps 1022 and 1032, nodes 101$_1$ and 101$_2$ use the information received at step 1018 to calibrate their local clocks relative to the timestamps received from optical power supply module 103. For example, in some embodiments, node 101$_1$ may be configured to assume a master role in system 100 and node 101$_2$ may be configured to assume a slave role. In this configuration, node 101$_1$ may adjust its local clock to always match the respective timestamp received from optical power supply module 103, i.e., the value $V_1$ of the synchronization counter 351 of FIG. 5B received by node 101$_1$ multiplied by the frame duration $T_F$ may represent absolute time $V_1 T_F$ at node 101$_1$. Node 101$_2$ may adjust its local clock to match the respective timestamp value $V_2$ received from optical power supply module 103 plus the propagation delay difference $(t_1-t_2)$, i.e., absolute time at note 101$_2$ may be obtained as $V_2 T_F+(t_1-t_2)$.

In some embodiments, node 101$_1$ may be configured to communicate information to node 101$_2$ such that the information arrives at node 101$_2$ precisely at time $t_0$. In this case, node 101$_1$ may send its information to node 101$_2$ when its local clock reads $t_0-t_{12}$.

In some embodiments, control system 106 may use its retrieved information for synchronization purposes across more than one network element of system 100. A person of ordinary skill in the art will understand that the above algorithm described for three network elements may be extended without limitation to an arbitrarily large network of arbitrarily many network elements.

In some embodiments, control system 106 may be a separate physical entity (e.g., a computer). In some embodiments, control system 106 may be distributed among different physical entities (e.g., among the network elements of system 100).

While system elements and method are described herein as examples for nodes 101, other network elements, such as nodes 103, 104, and 105 may also comprise the described optical communication elements that allow them to take part in the described time synchronization method. Hence any descriptions directed towards nodes 101 should not be construed as limiting to nodes 101 but apply equally to other network elements such as one or more optical power supply modules 103, optical multiplexing units 104, or optical switching units 105.

According to an example embodiment disclosed above, e.g., in the summary section and/or in reference to any one or any combination of some or all of FIGS. 1-10, provided is an apparatus (e.g., 100, FIG. 1) comprising: a light source (e.g., 210, FIG. 2); and an electronic controller (e.g., 202, FIG. 2) connected to cause the light source to produce a sequence (e.g., 200, FIGS. 2, 3A) of optical frame templates (e.g., 350, FIG. 3A), each of the optical frame templates comprising a respective frame header (e.g., 351, FIG. 3A), and a respective frame body (e.g., 352, FIG. 3A); wherein each frame body comprises a respective optical pulse train (e.g., 353, FIG. 3A); and wherein the light source and the electronic controller are configured to imprint control information (e.g., 211, FIG. 2) onto light of at least some of the optical frame templates using time intervals corresponding to the respective frame headers (e.g., as indicated in FIGS. 5A-5D) of the sequence.

In some embodiments of the above apparatus, said at least some of the optical frame templates include are at least three optical frame templates.

In some embodiments of any of the above apparatus, said at least some of the optical frame templates are copies of one another (e.g., 200, FIG. 3A).

In some embodiments of any of the above apparatus, none of the respective frame bodies of the sequence of optical frame templates carry payload data (e.g., 200, FIG. 3A).

In some embodiments of any of the above apparatus, the sequence of optical frame templates has a first time duration (e.g., $T_P$, FIG. 3A); each of the respective frame headers has a second time duration (e.g., $T_H$, FIG. 3A); each of the respective frame bodies has a third time duration (e.g., $T_B$, FIG. 3A), a sum of the second and third time durations being smaller than the first time duration; and each of the respective optical pulse trains has a period of a fourth time duration (e.g., $T_S$, FIG. 3A) that is smaller than a smaller one of the second and third time durations.

In some embodiments of any of the above apparatus, the fourth time duration (e.g., $T_S$, 353, FIG. 3) is at most 100 ps.

In some embodiments of any of the above apparatus, the third time duration is at least 10 longer than the fourth time duration (e.g., $T_B \geq 10\ T_S$, 352, 353, FIG. 3).

In some embodiments of any of the above apparatus, the third time duration is at least 100 longer than the fourth time duration (e.g., $T_B \geq 100\ T_S$, 352, 353, FIG. 3).

In some embodiments of any of the above apparatus, the third time duration is at least 1000 longer than the fourth time duration (e.g., $T_B \geq 1000\ T_S$, 352, 353, FIG. 3).

In some embodiments of any of the above apparatus, the second time duration is at most 10% of the third time duration (e.g., a $T_H \leq 0.1\ T_B$, 351, 352, FIG. 3).

In some embodiments of any of the above apparatus, the second time duration is at most 1% of the third time duration (e.g., a $T_H \leq 0.01\ T_B$, 351, 352, FIG. 3).

In some embodiments of any of the above apparatus, the first time duration is at least 10 times longer than the third time duration (e.g., a $T_P \geq 10\ T_B$, 200, 352, FIG. 3).

In some embodiments of any of the above apparatus, the first time duration is an integer multiple of the sum of the second and third time durations (e.g., a $T_P$ is an integer multiple of a $T_F$, 200, FIG. 3).

In some embodiments of any of the above apparatus, the sum of the second and third time durations is an integer multiple of the fourth time duration (e.g., a $T_F$ is an integer multiple of a $T_S$, 200, FIG. 3).

In some embodiments of any of the above apparatus, the sequence of optical frame templates is periodic with a period equal to the sum of the second and third time durations (e.g., $T_F = T_H + T_B$, 351, 352, FIGS. 3; 200, FIG. 5A).

In some embodiments of any of the above apparatus, the apparatus further comprises a reference clock, the reference clock comprising at least one of: a high-precision clock, a receiver capable of obtaining a reference clock from a Global Positioning System, and a device connectable to a stratum clock of a synchronous optical network.

In some embodiments of any of the above apparatus, the second and third time durations are derived from the reference clock.

In some embodiments of any of the above apparatus, the fourth time duration is derived from the reference clock.

In some embodiments of any of the above apparatus, the respective optical pulse trains of at least two optical frame templates of the sequence are frame-synchronized (e.g., 200, FIG. 3A, cf. definition in [78]).

In some embodiments of any of the above apparatus, the respective optical pulse trains of at least two optical frame templates are synchronized with one another (e.g., 200, FIG. 3A, cf. definition in [79]).

In some embodiments of any of the above apparatus, the respective optical pulse train of at least one optical frame template extends into the respective frame header thereof (e.g., 200, FIG. 3A).

In some embodiments of any of the above apparatus, the light source and the electronic controller are configured to imprint the control information using digital changes of an optical-field parameter (e.g., P, FIGS. 5C, 5D); and the optical-field parameter is selected from a parameter set consisting of: an intensity of light, a phase of light, a carrier frequency of light, and a polarization of light.

In some embodiments of any of the above apparatus, the control information comprises at least one of: a clock frequency, a clock phase, a synchronization time stamp, a frame delimiter, a frame counter, status information, a heartbeat signal, and a control command for a network element.

In some embodiments of any of the above apparatus, the light source comprises one or more of: a continuous-wave laser (e.g., 430, FIGS. 4A-4B, FIG. 6C), an optical modulator (e.g., 420, 440, 425, FIGS. 4A-4B), a directly modulated laser (e.g., 431, FIG. 4C), an actively mode-locked laser (e.g., 631, FIG. 6A), a passively mode-locked laser (e.g., 631, FIG. 6B), and an optical switch (e.g., 610, FIG. 6C).

In some embodiments of any of the above apparatus, the optical modulator (e.g., 440, FIG. 4A) comprises one or more of: an intensity modulator, a phase modulator, a polarization modulator, and a frequency shifter.

In some embodiments of any of the above apparatus, the apparatus further comprises an optical splitter (e.g., 480, FIG. 4A) configured to split the sequence of optical frame templates into two or more portions.

In some embodiments of any of the above apparatus, the light source comprises: a first optical pulse source (e.g., combination of $420_1$ and $430_1$, FIG. 6C) configured to emit light at a first carrier frequency; a second optical pulse source (e.g., combination of $420_2$ and $430_2$, FIG. 6C) configured to emit light at a second carrier frequency different from the first carrier frequency; and an optical switch (e.g., 610, FIG. 6C) configured to select either the light emitted by the first optical pulse source (e.g., 601, FIG. 6C) or the light emitted by the second optical pulse source (e.g., 602, FIG. 6C).

In some embodiments of any of the above apparatus, a difference between the first carrier frequency and the second carrier frequency is greater than a pulse-repetition rate of the respective optical pulse train (e.g., $|f_1 - f_2| \geq 1/T_S$).

In some embodiments of any of the above apparatus, the apparatus further comprises an optical modulator (e.g., 830, FIG. 8) configured to load different respective payload-data sequences into the respective frame bodies of different ones of the optical frame templates (e.g., as indicated in FIG. 3B).

In some embodiments of any of the above apparatus, the optical modulator and the light source are optically connected by way of at least one optical fiber (e.g., 102, FIG. 1).

In some embodiments of any of the above apparatus, the at least one optical fiber has a length of at least one meter.

According to another example embodiment disclosed above, e.g., in the summary section and/or in reference to any one or any combination of some or all of FIGS. 1-10, provided is an apparatus (e.g., 800, FIG. 8) comprising: a first optical interface (e.g., 810, FIG. 8) connectable to receive a sequence of optical frame templates (e.g., 200, FIG. 3A), each of the optical frame templates comprising a respective frame header (e.g., 351, FIG. 3A) and a respective frame body (e.g., 352, FIG. 3A), the frame body comprising a respective optical pulse train (e.g., 353, FIG. 3A); an optical splitter (e.g., 820, FIG. 8) connected to the first optical interface; an optical modulator (e.g., 830, FIG. 8) connected to a first output of the optical splitter and configured to load data (e.g., 813, FIG. 8) into the respective frame bodies to convert the sequence of optical frame templates into a corresponding sequence of loaded optical frames (e.g., 852, FIG. 8); and an optical receiver (e.g., 880, FIG. 8) connected to a second output of the optical splitter and configured to extract control information (e.g., 882, FIG. 8) from the respective frame headers.

In some embodiments of the above apparatus, the extracted information comprises at least one of: a clock frequency, a clock phase, a synchronization time stamp, a frame delimiter, a frame counter, status information, a heartbeat signal, and a control command for a network element.

In some embodiments of any of the above apparatus, the optical modulator is configured to modulate one or more of: an intensity of light, a phase of light, a carrier frequency of light, and a polarization of light.

In some embodiments of any of the above apparatus, the optical modulator is configured to modulate at a symbol rate equal to a pulse-repetition rate of the respective optical pulse train.

In some embodiments of any of the above apparatus, the optical modulator is configured to modulate individual pulses of the respective optical pulse train.

In some embodiments of any of the above apparatus, the optical receiver comprises one or more of: a p-i-n photodetector, an avalanche photodetector, a coherent receiver (e.g., 910, FIGS. 9A-9D), electronic processing circuitry (e.g., 920, FIGS. 9B-9D), and one or more optical elements configured to convert encoded optical signals into optical signals detectable using intensity detection (e.g., 930, FIGS. 9C-9D).

In some embodiments of any of the above apparatus, the one or more optical elements comprise one or more of: a polarization filter, a polarization splitter, a delay interferometer, a wavelength filter, a wavelength demultiplexer, and a spatial-mode demultiplexer.

In some embodiments of any of the above apparatus, the apparatus further comprises a second optical interface (e.g., 860, FIG. 8) connectable to receive another sequence of loaded optical frames (e.g., 853, FIG. 8); and a second optical receiver (e.g., 870, FIG. 8) connected to the second optical interface and configured to extract information (e.g., 872, 816, FIG. 8) from said another sequence.

In some embodiments of any of the above apparatus, the extracted information comprises at least one of: a clock frequency, a clock phase, a synchronization time stamp, a frame delimiter, a frame counter, status information, a heartbeat signal, and a control command for a network element.

According to another example embodiment disclosed above, e.g., in the summary section and/or in reference to any one or any combination of some or all of FIGS. 1-10, provided is an apparatus (e.g., 100, FIG. 1) comprising a control system (e.g., 106, FIG. 1) configured to synchronize two or more network elements (e.g., 101$_1$-101$_6$, FIG. 1), the control system comprising: a first port (e.g., 107$_1$, FIG. 10A) configured to receive a first local time information from a first network element (e.g., 101$_1$, FIG. 10A); a second port (e.g., 107$_2$, FIG. 10A) configured to receive a second local time information from a second network element (e.g., 101$_2$, FIG. 10A); a processor (e.g., 1040, FIG. 10A) configured to compute, from the first and second local time informations, one or more global time values; and a third port (e.g., 107$_{105}$, FIG. 1) configured to transmit the one or more global time values to the first network element or to a third network element (e.g., 105, FIG. 1) different from the first and second network elements.

In some embodiments of the above apparatus, the first local time information and the second local time information each comprise two respective local time values, said local time values being associated with a same time stamp (e.g., $T_0$) extracted by each of the first and second network elements from respective sequences (e.g., 200, 300, FIG. 3A) of optical frame templates and loaded optical frames received thereat.

In some embodiments of any of the above apparatus, the first local time information and the second local time information each represent a function of two local time values, said local time values being associated with a same time stamp (e.g., $T_0$) extracted by each of the first and second network elements from respective sequences (e.g., 200, 300, FIG. 3A) of optical frame templates and loaded optical frames received thereat.

In some embodiments of any of the above apparatus, the control system is configured to compute a sum of the received first local time information and the received second local time information (e.g., at 1016, FIG. 10B).

In some embodiments of any of the above apparatus, the control system is configured to compute a difference of the received first local time information and the received second local time information (e.g., at 1016, FIG. 10B).

In some embodiments of any of the above apparatus, the processor is a distributed processor having parts thereof located at different computers.

In some embodiments of any of the above apparatus, the processor is physically integrated into one or more network elements.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled or referred to as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure.

What is claimed is:

1. An apparatus comprising:
   a first optical interface connectable to receive a sequence of optical frame templates, each of the optical frame templates comprising a respective frame header and a respective frame body, the frame body comprising a respective optical pulse train;
   an optical splitter connected to the first optical interface;
   an optical modulator connected to a first output of the optical splitter and configured to load data into the respective frame bodies to convert the sequence of optical frame templates into a corresponding sequence of loaded optical frames; and an optical receiver connected to a second output of the optical splitter and configured to extract control information from the respective frame headers.

2. The apparatus of claim 1, wherein the extracted control information comprises at least one of:

a clock frequency, a clock phase, a synchronization time stamp, a frame delimiter, a frame counter, status information, a heartbeat signal, or a control command for a network element.

3. The apparatus of claim 1, wherein the optical modulator is configured to modulate at a symbol rate equal to a pulse-repetition rate of the respective optical pulse train.

4. The apparatus of claim 1, further comprising a second optical interface connectable to receive another sequence of loaded optical frames; and a second optical receiver connected to the second optical interface and configured to extract information from said another sequence.

5. The apparatus of claim 4, wherein the extracted information comprises at least one of:

a clock frequency, a clock phase, a synchronization time stamp, a frame delimiter, a frame counter, status information, a heartbeat signal, or a control command for a network element.

6. The apparatus of claim 1 wherein the optical splitter comprises at least one of an optical power splitter, a wavelength splitter, a polarization splitter, or a spatial-distribution splitter.

7. The apparatus of claim 1 wherein at least a portion of the optical splitter is integrated with at least a portion of the first optical interface.

8. The apparatus of claim 1, comprising a polarization-diversity grating-coupling arrangement that is configured to perform at least a portion of the function of the first optical interface and a least a portion of the function of the optical splitter.

9. The apparatus of claim 8 wherein the polarization-diversity grating-coupling arrangement comprises a polarization-diversity vertical grating coupler.

10. The apparatus of claim 1 wherein the optical modulator at some periods of time does not load data into the frame bodies of some of the optical frame templates, and the apparatus is configured to pass the optical frame templates without data loaded into the frame bodies on to another device external to the apparatus.

11. The apparatus of claim 1 wherein the optical modulator comprises at least one of an in-phase/quadrature modulator, a segmented-electrode modulator, an electro-absorption modulator, a ring modulator, or a Mach-Zehnder modulator.

12. The apparatus of claim 1 wherein the apparatus is configured to provide the extracted control information to another device external to the apparatus.

13. The apparatus of claim 1, comprising a processor that is configured to:

process data based on the extracted control information to generate electrical drive signals for driving the optical modulator to cause the data to be loaded into the respective frame bodies, wherein the processing of the data comprises at least one of retiming, de-skewing, buffering, bit stuffing, bit removal, forward error correction coding, line coding, framing, insertion of pilots and packet headers, time-stamping, linear pre-compensation, nonlinear pre-compensation, pre-equalization, pre-emphasis, or pre-distortion.

14. The apparatus of claim 1, comprising a second optical modulator connected to a second output of the optical splitter, wherein the first optical modulator is configured to load first data into first respective frame bodies to convert a first portion of the sequence of optical frame templates into a corresponding sequence of first loaded optical frames, and the second optical modulator is configured to load second data into second respective frame bodies to convert a second portion of the sequence of optical frame templates into a corresponding sequence of second loaded optical frames, the apparatus further comprising a multiplexer to multiplex the first loaded optical frames with the second loaded optical frames to generate multiplexed optical signals that are provided to an output optical interface.

15. The apparatus of claim 14 wherein the first loaded optical frames and the second loaded optical frames are multiplexed in at least one of wavelength, polarization, or spatial distribution of the optical field to generate multiplexed optical signals.

16. The apparatus of claim 14 wherein at least a portion of the multiplexer is integrated with at least a portion of the output optical interface.

17. The apparatus of claim 14, comprising a polarization-diversity grating-coupling arrangement that is configured to perform at least a portion of the function of the multiplexer and at least a portion of the function of the output optical interface.

18. The apparatus of claim 17 wherein the polarization-diversity grating-coupling arrangement comprises a polarization-diversity vertical grating coupler.

19. The apparatus of claim 1, comprising:

a second optical interface configured to receive a sequence of loaded optical frames, each loaded optical frame comprising a respective frame header and a respective frame body that is loaded with data, and an optical receiver to convert the loaded optical frames to electrical signals.

20. The apparatus of claim 19, comprising a processor configured to process the electrical signals to generate one or more electrical data signals, in which the processing of the electrical signals comprises at least one of linear equalization, nonlinear equalization, clock recovery, retiming, de-skewing, buffering, forward error correction decoding, line decoding, de-framing, pilot removal, inspection of packet headers, or manipulation of packet headers.

21. The apparatus of claim 20 wherein the processor is configured to process the electrical signals based on the extracted control information.

22. The apparatus of claim 1, comprising:

a second optical interface configured to receive a sequence of loaded optical frames, each loaded optical frame comprising a respective frame header and a respective frame body that is loaded with data, and an optical demultiplexer configured to demultiplex the sequence of loaded optical frames into demultiplexed sequences of loaded optical frames.

23. The apparatus of claim 22 wherein at least a portion of the optical demultiplexer is integrated with at least a portion of the second optical interface.

24. The apparatus of claim 22, comprising a polarization-diversity grating-coupling arrangement that is configured to perform at least a portion of the function of the optical demultiplexer and at least a portion of the function of the second optical interface.

25. The apparatus of claim 24 wherein the polarization-diversity grating-coupling arrangement comprises a polarization-diversity vertical grating coupler.

26. The apparatus of claim 1 wherein the optical receiver comprises:
an optical-to-electrical conversion device configured to convert an optical signal from the second output of the optical splitter into a corresponding electrical output signal, and
an information extraction device configured to extract the control information from the electrical output signal, wherein the information extraction device comprises an electrical bandpass filter centered approximately at a characteristic frequency component contained in the optical frame template, and the characteristic frequency component comprises at least one of a main clock frequency or a main framing frequency.

27. The apparatus of claim 1 wherein the optical frame templates are encoded using at least one parameter of an optical field that comprises at least one of a polarization state, a phase of optical field, a wavelength, or a spatial mode, and
the optical receiver comprises:
an optical element configured to convert the optical frame templates into an intensity-modulated optical signal that is detectable using direct intensity detection,
an optical-to-electrical conversion device configured to convert the intensity-modulated optical signal into a corresponding electrical output signal, and
an information extraction device configured to extract the control information from the electrical output signal.

28. The apparatus of claim 27 wherein at least one of:
the optical element comprises at least one of a polarizer or a polarization beam splitter in case the parameter of the optical field comprises the polarization state,
the optical element comprises an optical delay interferometer in case the parameter of the optical field comprises the phase of optical field,
the optical element comprises an optical filter in case the parameter of the optical field comprises the wavelength, or
the optical element comprises a spatial-mode demultiplexer in case the parameter of the optical field comprises the spatial mode.

29. The apparatus of claim 27 wherein the optical frame templates are encoded using two or more optically separable parameter states comprising at least one of two orthogonal polarizations, two opposite optical phases, two or more orthogonal frequencies, or two or more orthogonal spatial modes,
the optical element is configured to split the encoded optical frame templates into separable parameter components that have at least one of two orthogonal polarizations, two opposite optical phases, two or more orthogonal frequencies, or two or more orthogonal spatial modes,
the optical receiver comprises at least two optical-to-electrical conversion devices that are configured to convert the separable parameter components into corresponding electrical output signals, wherein each optical-to-electrical conversion device is configured to convert the respective parameter component into the corresponding electrical output signal.

30. The apparatus of claim 1 wherein the optical receiver comprises:
an optical-to-electrical conversion device configured to convert an optical signal from the second output of the optical splitter into a corresponding electrical output signal, and
an information extraction device configured to extract the control information from the electrical output signal, wherein the information extraction device comprises at least one difference function to implement balanced detection.

31. A system comprising:
a first network device comprising:
an input optical interface configured to receive a sequence of optical frame templates, each of the optical frame templates comprising a frame header and a frame body, the frame body comprising an optical pulse train;
an optical splitter optically coupled to the first optical interface and configured to separate the sequence of optical frame templates into at least a first group of optical frame templates and a second group of optical frame templates;
a first optical modulator configured to load first data into frame bodies of the first group of optical frame templates to generate a first sequence of loaded optical frames; and
an optical receiver configured to extract control information from the frame headers of the second group of optical frame templates.

32. The system of claim 31, wherein the first network device comprises a processor that is configured to:
process data based on the extracted control information to generate electrical drive signals for driving the optical modulator to cause the data to be loaded into the respective frame bodies,
wherein the processing of the data comprises at least one of retiming, de-skewing, buffering, bit stuffing, bit removal, forward error correction coding, line coding, framing, insertion of pilots and packet headers, time-stamping, linear pre-compensation, nonlinear pre-compensation, pre-equalization, pre-emphasis, or pre-distortion.

33. The system of claim 31, comprising:
a second network device comprising:
an input optical interface configured to receive a sequence of optical frame templates;
an optical splitter optically coupled to the first optical interface and configured to separate the sequence of optical frame templates into at least a first group of optical frame templates and a second group of optical frame templates;
a first optical modulator configured to load first data into frame bodies of the first group of optical frame templates to generate a first sequence of loaded optical frames; and
an optical receiver configured to extract control information from the second group of optical frame templates;
wherein the first network device is configured to determine a first local time information based on the control information extracted from the second group of optical frame templates received at the first network device, and the second network device is configured to determine a second local time information based on the control information extracted from the second group of optical frame templates received at the second network device;

the system further comprising a processor configured to determine, from the first and second local time information, one or more global time values, wherein the processor is further configured to provide the one or more global time values to the first network device or to a third network device different from the first and second network devices.

34. The system of claim 33 wherein the processor is configured to determine a sum of the first local time information and the second local time information.

35. The system of claim 33 wherein the processor is configured to determine a difference between the first local time information and the second local time information.

36. A method comprising:
receiving a sequence of optical frame templates, each of the optical frame templates comprising a respective frame header and a respective frame body, the frame body comprising a respective optical pulse train;
separating the sequence of optical frame templates into a first group of optical frame templates and a second group of optical frame templates;
modulating the optical pulse trains of the frame bodies of the first group of optical frame templates based on data to generate a sequence of loaded optical frames; and
extracting control information from the frame headers of the second group of optical frame templates.

37. The method of claim 36, comprising:
processing data based on the extracted control information to generate electrical drive signals for driving the optical modulator to cause the data to be loaded into the respective frame bodies,
wherein the processing of the data comprises at least one of retiming, de-skewing, buffering, bit stuffing, bit removal, forward error correction coding, line coding, framing, insertion of pilots and packet headers, time-stamping, linear pre-compensation, nonlinear pre-compensation, pre-equalization, pre-emphasis, or pre-distortion.

38. The method of claim 36 wherein extracting the control information comprises extracting at least one of a clock frequency, a clock phase, a synchronization time stamp, a frame delimiter, a frame counter, status information, a heartbeat signal, or a control command for a network element.

39. The method of claim 36 wherein modulating the optical pulse trains comprises modulating the optical pulse trains at a symbol rate equal to a pulse-repetition rate of the respective optical pulse train.

* * * * *